(12) United States Patent
Mues et al.

(10) Patent No.: US 8,038,880 B2
(45) Date of Patent: Oct. 18, 2011

(54) MEMBRANE BAGS WITH SEAMLESS MEMBRANE SUBSTANCE, USES THEREOF, FILTRATION UNITS THEREWITH AND MANUFACTURING PROCESSES

(75) Inventors: Willem Mues, Tremelo (BE); Bart Cobben, Reet (BE); Wim Doyen, Wommelgem (BE); Walter Adriansens, Mol (BE); Bart Molenberghs, Mol (BE)

(73) Assignee: De Vlaamse Instelling voor Technologisch Onderzoek (VITO) N.V., Mol (BE)

( * ) Notice: Subject to any disclaimer, the term of this patent is extended or adjusted under 35 U.S.C. 154(b) by 441 days.

(21) Appl. No.: 12/121,418

(22) Filed: May 15, 2008

(65) Prior Publication Data

US 2009/0078644 A1    Mar. 26, 2009

(30) Foreign Application Priority Data

May 18, 2007 (EP) .................... 01708483

(51) Int. Cl.
*C02F 3/00* (2006.01)
(52) U.S. Cl. ........ 210/601; 210/486; 428/35.2; 427/359
(58) Field of Classification Search ............. 210/601, 210/486; 428/35.2; 427/359
See application file for complete search history.

(56) References Cited

U.S. PATENT DOCUMENTS

| | | | |
|---|---|---|---|
| 4,871,456 A | 10/1989 | Naruo et al. | |
| 5,275,725 A | 1/1994 | Ishii et al. | |
| 5,482,625 A * | 1/1996 | Shimizu et al. | 210/321.84 |
| 2005/0000881 A1 | 1/2005 | Bruss | |
| 2008/0000827 A1 | 1/2008 | Bruss | |
| 2008/0164208 A1 * | 7/2008 | Doyen et al. | 210/650 |
| 2008/0257817 A1 * | 10/2008 | Kamleiter et al. | 210/489 |

FOREIGN PATENT DOCUMENTS

| | | |
|---|---|---|
| CA | 2 552 533 A1 | 4/2005 |
| DE | 10343456 B3 * | 12/2004 |
| EP | 1625885 A1 * | 2/2006 |
| JP | 11 244672 | 9/1999 |
| JP | 2001-321645 | 11/2001 |
| JP | 2003-135939 A | 5/2003 |
| JP | 2003-144869 A | 5/2003 |
| WO | WO 03/037489 A1 | 5/2003 |
| WO | WO 2006/015461 A1 | 2/2006 |
| WO | WO 2006/056159 A1 | 6/2006 |

* cited by examiner

*Primary Examiner* — Chester T Barry
(74) *Attorney, Agent, or Firm* — Leydig, Voit & Mayer, Ltd.

(57) ABSTRACT

Disclosed are seamless membrane bags, for example, a membrane bag comprising a spacer fabric and a volume for permeate collection, the spacer fabric comprising a first part and a second part that are spaced apart and tied together at a predefined distance by monofilament thread and the first and second parts are at least partially embedded with membrane substance and the volume for permeate collection is interposed between the first and second parts. The membrane substance embeds portions of the monofilament thread and fills the spacer fabric along the border of the membrane bag. The membrane substance completely enclosing the volume is seamless. Also disclosed are processes for producing such bags, a filtration unit comprising such a membrane bag, and their uses in the separation of fluids, vapors and particles.

25 Claims, 6 Drawing Sheets

MEMBRANE BAGS WITH SEAMLESS MEMBRANE SUBSTANCE, USES THEREOF, FILTRATION UNITS THEREWITH AND MANUFACTURING PROCESSES

CROSS-REFERENCE TO RELATED PATENT APPLICATIONS

This application claims the benefit of European Application No. 07108483 filed May 18, 2007, which is herein incorporated by reference.

FIELD OF THE INVENTION

The present invention is related to membrane bags with seamless membrane substance, uses thereof, filtration units also known as membrane pockets or cartridges incorporating such membrane bags and methods of manufacturing seamless membrane bags.

BACKGROUND OF THE INVENTION

There has been much interest in membrane bioreactors (MBRs) in the water-world in recent years. MBR is a combination of two basic processes—biological degradation and membrane separation—into a single process where suspended solids and microorganisms responsible for biodegradation are separated from the treated water by membrane filtration unit. To date research has concentrated on the applicability of MBRs for domestic, industrial and mixed domestic and industrial waste-water treatment plants, concentrated flows from industrial production processes, the treatment of percolate water from waste disposal sites and the dewatering of sludge. The success of membrane bioreactors for waste-water applications led to a study of the application of MBR concepts in the drinking water production process.

In wastewater MBR-applications biological treatment in a reactor is combined with physical treatment by membrane filtration. By using membrane filtration instead of a settling process, high sludge loads can be maintained in the reactor, which (theoretically) lead to high biological degradation rates with a low sludge production. Sludge concentrations of 15-20 g/l are mentioned in the MBR-literature. The high efficiency of the process would make it possible to process highly concentrated flows and to design systems with a small footprint. In practice, the footprint is reduced by the smaller area required for the membrane filtration due to a maximal maintainable sludge concentration of 8-12 g/l and dispensing with a settlement tank. In addition higher sludge production rates have been registered than in conventional settlement systems.

JP 2003-135939A discloses a separation membrane manufactured by forming the porous resin layer on the surface of the porous base material composed of an organic fiber, part of a resin forming the porous resin layer being infiltrated into at least the surface layer part of the porous base material to form a composite layer with the porous base material at least in the surface layer part.

JP 2003-144869A discloses a separation membrane having a porous resin layer formed on the surface of the porous base material and a combined layer formed by integrating a part of a resin forming the porous resin layer with the porous base material, the pores satisfying the relationship: $2\ dB \leq dA$ (wherein dA is the average pore diameter on the surface of the side of the liquid to be treated; dB is the average pore diameter on the surface of the side of the permeated liquid) are formed on both surfaces of the porous resin layer.

JP 2001-321645A discloses a filter membrane element in which flow path materials are arranged on both the surface of a support plate and liquid separation membranes for removing impurities in the liquid above the flow path materials, the filter member element having a gap for water collection penetrating both surfaces of the support plate on a portion of the support plate; and a gap for water collection being arranged in the direction of a takeout port of the permeated water and communicating with the exit port of the permeated water.

U.S. Pat. No. 4,871,456 discloses a flat-plate laminated filter cartridge, comprising at least one filtering unit, in which said filtering unit comprises: an inner rim; an outer member surrounding an outer periphery of and spaced apart from said inner rim; upper and lower filtering films extending between said inner rim and said outer member and each having an entire inner periphery which is bonded to said inner rim, and an entire outer periphery which is bonded to at least one of another said outer periphery and said outer member so as to form a space therebetween serving as a path of a solution to be filtered; and at least one film supporting member made of one of paper, unwoven cloth and net, disposed on at least one of both sides of said upper and lower filtering films, and between said upper and lower filtering films. U.S. Pat. No. 4,871,456 further discloses that the filtering film supporting member is not at all bonded to the upper and lower filtering films and it is provided only to support the filtering films from inside.

U.S. Pat. No. 5,482,625 discloses a filtration membrane module submerged with a processed liquid in a processing tank comprising: a plurality of flat, rigid membrane cartridges vertically placed in parallel to each other as properly spaced from the adjoining membrane cartridges; cleaning stream generating means for supplying a flow parallel to the membrane surfaces of the membrane cartridges which opposes to gaps defined between the membrane cartridges opposite to each other; and sucking means for sucking permeated liquid in each membrane cartridge which is communicated with the passage of permeated liquid in each membrane cartridge; each membrane cartridge having a membrane supporting plate and a filtration membrane covering the outer surface thereof; and the membrane supporting plate supporting the filtration membrane is being made hollow by using a rigid structural member, the inside of the plate forming a passage of permeated liquid, the membrane supporting plate having an opening formed on the surface opposite to the filtration membrane the opening communicating to the passage of permeated liquid. The membrane cartridges can be membrane bags as illustrated in FIG. 27.

WO 03/037489A discloses a filtration-module for the cleaning of waste-water with a multiplicity of filtration membrane pockets each having at least one opening for the dewatering of its interior space and which are disposed vertically, parallel to one another and preferably at the same spacing to one another in a rigid holder and so arranged that the intervening spaces lying between neigboring filter membrane pockets are intensively traversed by a liquid, characterized in that the filter membrane pockets are configured to be substantially flat and flexible and on opposite sides are fixedly connected with the holder which has at least one suction line for carrying off liquid drawn through the filter membrane pocket opening, and in that the filter membrane pockets have a flexible liquid permeable core and/or a plurality of flexible permeable core elements.

JP 11-244672A discloses an element with longitudinally long permeate flow passage materials which are relatively flexible and allow the passing of the permeate and flat members disposed along both sides thereof, sealing parts being formed by tightly adhering the peripherally marginal three sides at the top end and both right and left ends thereof to constitute the quadrilateral flat planar membrane formed as a bag form. JP 11-244672A further discloses that the one side at the unsealed peripheral edge of the flat planar membrane installed with the membrane supporting member is superposed by about 1.5 cm in height on the surface on both sides of the upper part of the membrane supporting member and is welded to the membrane supporting member to support the flat planar membrane; that the heads larger in thickness than the membrane supporting member are formed at both ends of the membrane supporting member; and that both of the heads are provided with the nozzles which are communicated with the flow passages of the membrane supporting member and are used to take out the permeate.

U.S. Pat. No. 5,275,725 discloses in a second embodiment the forming the flat membrane support by casting a solution of the membrane-forming polymer on the surfaces of a membrane support and immersing the support in a suspended solidifying bath to form the semipermeable membrane parts by the so-called phase inversion method, wherein the permselective membranes can be bonded to the support by the anchoring effect wherein the penetration of the membrane-forming polymer solution into the nonwoven fabric constituting the surface layer of the support is arrested by the fibers after the gelation.

The membrane plates (filter pockets, bag with four-sided flat planar membrane) of the above-mentioned prior art are formed by bringing together the separate constituents (two membranes, spacer and support) and the two membranes are placed with their membrane supports opposite one another and a spacer is placed between them creating a gap. The resulting weak points of these concepts including the large number of construction steps; poor adhesion of the membrane to the module support resulting in detachment and stripping of the membrane; and operational problems due to the impossibility of back-flushing the membranes with sufficient pressure, as a result of the poor adhesion of the membranes to their supports, were addressed in WO 2006/056159A and WO 2006/015461A.

WO 2006/056159A discloses a frameless plate-shaped filter element, particularly for filtering fluid media, comprising outer filter layers and at least one layer of membrane material wherein between the outer filter layers at least one inner layer is provided that comprises at least on one face a plurality of bumps that are distributed across the face and mounted at a spacing from each other, the end surfaces of which bumps form a contact surface for an outer fluid-permeable layer. The attachment of the membrane layer to the reinforcing structure is however poor resulting in low backflush pressures that can be used.

CA 2 552 533A1 discloses a filter medium with at least one filter membrane which has a fabric ply as the support and protective layer, characterized in that at least one other filter membrane with another fabric ply is present as the support and protective layer, that between the two adjacent filter membranes a third fabric ply extends, and that the two adjacent filter membranes are connected to one another via threads of the two other fabric plies which extend through the third fabric ply.

WO 2006/015461A discloses an integrated permeate channel (IPC) membrane, comprising a permeate channel consisting of a spacer fabric having an upper and a lower fabric surface tied together and spaced apart by monofilament threads at a predefined distance, said permeate channel being interposed between two membrane layers, wherein said membrane layers are linked at a multitude of points with said upper and lower fabric surfaces. IPC membrane cartridges have a high resistance to backflush pressures thereby increasing their efficiency and WO 2006/015461A further discloses that it is possible to obtain an asymmetric spacer fabric-reinforced membrane with different pore size characteristics at both sides by applying different conditions on both sides of the dope coated spacer fabric.

However, WO 2006/015461A discloses the following manufacturing steps:

Spacer fabric preparation step: spacer fabric (knitted, woven or non/woven) unwinding; spacer fabric guiding into vertical position and spacer fabric spreading to prevent fold formation (perpendicular to the fabrication direction);

Spacer fabric coating step: simultaneous double-side coating of dope with a double-sided coating system and automatic dope feeding on both sides of the spacer fabric (same level at both sides) to obtain a dope coated spacer fabric;

Surface pore formation step: contacting of the double-side coated spacer fabric with water vapour phase. It is also possible to obtain an asymmetric spacer fabric-reinforced membrane with different pore size characteristics at both sides by applying different conditions on both sides of the dope coated spacer fabric.

Bulk formation step: coagulation of product into a hot water bath;

Post-treatment step: washing out of chemicals in a water reservoir; and

Drying step: drying of the product.

WO 2006/015461A also discloses the preferred presence of a sealant at the perimeter of the planar membrane arranged to prevent direct fluid movement from or to the permeate channel without passing through a membrane layer. Moreover, in the single exemplification of the use of IPC-membranes disclosed in WO 2006/015461A (Application 1) a sealant such as epoxy/polyurethane, any rubber or a hot melt or even welding was deemed necessary to close at least two (preferably opposite) edges of the IPC-MBR membrane 1. Individual sealing of the IPC-membrane requires considerable manutention for a single IPC-membrane meaning high production costs. Moreover, the presence of a sealant reduces the efficiency of the filtration process by creating a blind area thereby reducing the filtration efficiency. Moreover, the sealing of membrane cartridges made from an IPC membrane can constitute a weak point, which places a limit on the allowable backflush pressure.

The production technology for IPC-membranes disclosed in WO 2006/015461A1 does not lend itself to large-scale production thereof. Wide-scale application of IPC-membranes in membrane bioreactors, in water filtration and waste water purification depends upon the development of manufacturing technology capable of large-scale production of IPC-membranes with resulting economies of scale. Furthermore, it is desirable that the pores in the membranes be asymmetric with pores with a larger opening at the membrane-integrated permeate channel interface than at the outermost surface of the membranes.

It is therefore desirable to develop manufacturing technology capable of large-scale production of IPC-membranes with resulting economies of scale without qualitative degradation of the resulting IPC-membranes.

ASPECTS OF THE INVENTION

It is an aspect of the present invention to provide an alternative and particularly an improved method of manufacturing an integrated permeate channel membrane, thereby obviating the drawbacks of methods of the prior art.

It is an aspect of the present invention to provide manufacturing technology capable of automation to large-scale production of IPC-membranes without qualitative degradation of the resulting membrane units with an integrated membrane channel.

It is a further aspect of the present invention to provide manufacturing technology capable of reducing the production costs of membrane units with an integrated permeate channel.

It is also an aspect of the present invention to provide a membrane unit with an integrated permeate channel not requiring a sealant at the perimeter of the membrane arranged to prevent direct fluid movement from or to the permeate channel without passing through a membrane.

It is also an aspect of the present invention to provide a membrane unit with membranes having asymmetric pores with a larger opening at the interface between the membrane and the integrated permeate channel than at the outermost surface of the membranes.

Further aspects and advantages of the present invention will become apparent from the description hereinafter.

SUMMARY OF THE INVENTION

Surprisingly it has been found that a seamless membrane bag comprising a spacer fabric having a uniform structure can be realized, wherein the spacer fabric comprises a first and a second part of the fabric spaced apart and tied together at a predefined distance by monofilament thread, with the monofilament spacer thread preferably forming loops through the first and second parts of the spacer fabric; the first and second parts of the fabric with the optional loops are impregnated with membrane substance to form two membranes having an integrated permeate channel between the innermost surfaces thereof; the two membranes have edges, the corresponding edges of each of the membranes being joined together by the membrane substance bridging the distance between the membranes; a tube is provided for extracting permeate from the integrated permeate channel; and preferably none of the spacer fabric is exposed on the outermost surfaces of the membranes non-contiguous with the integrated permeate channel.

Furthermore, it has surprisingly been found that such seamless membrane bags have the desired asymmetric pores with a larger opening at the interface between the membranes and the integrated permeate channel than at the outermost surface of the membranes.

Aspects of the present invention are realized by a membrane bag comprising a spacer fabric [10] and a volume [23] for permeate collection, the spacer fabric comprising a first [11, 101] and a second [12, 101'] part of the spacer fabric, wherein: the first and second parts of the spacer fabric are spaced apart and tied together at a predefined distance by monofilament thread [15, 103]; the first and second parts of the spacer fabric are at least partially embedded with membrane substance; the volume for permeate collection is interposed between the first and second parts of the spacer fabric; the membrane substance embeds portions of the monofilament thread; the membrane substance fills the spacer fabric along the border of the membrane bag; and wherein the membrane substance [43, 104] completely enclosing the volume [23, 102] is seamless.

Aspects of the present invention are also realized by a membrane bag comprising a spacer fabric [10] and a volume [23] for permeate collection the spacer fabric comprising a first [11] and a second [12] part of the spacer fabric, wherein the first and second parts of the spacer fabric are spaced apart and tied together at a predefined distance by monofilament thread [15]; the spacer fabric [10] comprises one or more first regions [13] in which the fabric of the first part and the fabric of the second part have a first structure and one or more second regions [14] in which the fabric of the first part and the fabric of the second part have a second structure, the second structure having larger meshes than the first structure; each of the one or more first regions is fully delimited around by the one or more second regions; in the one or more first regions the first part and the second part of the spacer fabric is at least partially embedded with membrane substance leaving the volume [23] between the first part and the second part free from membrane substance; and the one or more second regions of the spacer fabric the spacer fabric is filled with the membrane substance.

Aspects of the present invention are also provided by a process for producing at least one seamless membrane bag, the process comprising the steps of: (i) providing a spacer fabric having a uniform structure, the spacer fabric comprising a first [101] and a second part [101'] of the fabric spaced apart and tied together at a predefined distance by monofilament thread [103]; (ii) transporting the fabric adjacent to at least one impregnation unit [106]; (iii) impregnating the first [101] and second parts [101'] of the spacer fabric and the tying points of the monofilament thread to the first [101] and second parts [101'] of the spacer fabric with membrane dope [107] with the at least one impregnation unit [106] such that in predefined continuous regions not only the first and second part of the fabric are impregnated but also the space therebetween thereby producing at least one seamless membrane bag precursor; (iv) forming the at least one membrane bag from the at least one membrane bag precursor, each of the at least one membrane bags comprising a volume [102] completely enclosed with seamless membrane substance; and (v) optionally inserting a tube for extracting permeate from the volume [105].

Aspects of the present invention are also provided by a method of manufacturing a membrane bag, the method comprising the steps of: providing a spacer fabric [10] comprising a first [11] and a second [12] part of fabric, wherein the first and the second parts are spaced apart and tied together at a predefined distance by monofilament thread [15] and wherein the spacer fabric comprises one or more first regions [13] in which the fabric of the first part [11] and the fabric of the second part [12] have a first structure, and one or more second regions [14] in which the fabric of the first part and the fabric of the second part have a second structure having larger meshes than the first structure, and wherein each of the one or more first regions are delimited fully around by the one or more second regions; impregnating the first [11] and the second [12] parts with membrane dope [43] wherein, in the one or more first regions, the dope at least partially embeds the first part and the second part and leaves a space [23] between the first part and the second part free from membrane dope and wherein, in the one or more second regions, the dope fills the spacer fabric; and forming the membrane [35, 36].

Aspects of the present invention are also realized by a membrane bag obtainable by the above-described process or the above-described method.

Aspects of the present invention are also realized by a filtration unit comprising at least one above-disclosed membrane bag.

Aspects of the present invention are also realized by the use of at least one above-disclosed membrane bag in a membrane bioreactor.

Aspects of the present invention are also realized by the use of at least one above-disclosed membrane bag in water filtration or waste water purification.

Aspects of the present invention are also realized by the use of at least one above-disclosed membrane bag for the filtration or separation of a mixture of fluids, vapours and particles.

Further aspects of the present invention are disclosed in the dependent claims.

DETAILED DESCRIPTION

Definitions

The term "seamless", as used in disclosing the present invention, means an absence of seams, such as from an adhesive, lamination, pressing, welding etc., not capable of participating in membrane filtration. As a result, the membrane substance [43, 104] of the membrane bag [40] is porous all over in all directions.

The term "membrane bag", as used in disclosing the present invention, means a bag comprising at least one membrane.

The term "seamless membrane bag", as used in disclosing the present invention, means a volume for permeate collection completely enclosed in seamless membrane substance (membrane material) with the exception of an optional tube for extracting permeate from the volume.

The term "integrated permeate channel", as used in disclosing the present invention, means the volume enclosed in the membrane bag, i.e. the permeate channel, is inseparable from the membrane bag itself.

The term "spacer fabric", as used in disclosing the present invention, means a fabric with a three dimensional integral structure of threads e.g. constructed from face yarns and pile yarns. Such fabrics may be woven or non-woven and are preferably knitted, braided or crocheted.

The term "uniform spacer fabric", as used in disclosing the present invention, means a spacer fabric in which there are no regions in the first and second parts of the fabric, which have a different mesh size. This does not exclude the first and second parts of the spacer fabric having different mesh sizes.

The term "non-uniform spacer fabric", as used in disclosing the present invention, means a spacer fabric in which there are regions of the first and second parts of the fabric, which have a different mesh size.

The term "part of a spacer fabric", as used in disclosing the present invention, means an integral part or layer of the spacer fabric.

The term "membrane substance", as used in disclosing the present invention, is a membrane material i.e. a material with membrane properties. The membrane substance can be homogeneous or inhomogeneous.

The term "border of a membrane bag", as used in disclosing the present invention, means that part of the membrane bag in which the predefined space between the membrane substance-impregnated first and second parts of the spacer fabric is filled by membrane substance, i.e. the first and second parts of the spacer fabric are bridged by membrane substance, to define the edges of the membrane bag.

The term "coating the first and second layers of spacer fabric with membrane substance", as used in disclosing the present invention, means applying to the first and second layers (parts) of the spacer fabric the membrane substance which, depending upon the application conditions, will partially or fully penetrate the first and second layers (parts) of the spacer fabric thereby partially or fully embedding the first and second parts of the spacer fabric with the membrane substance.

The term "embedded with membrane substance", as used in disclosing the present invention, means impregnated with the membrane substance resulting in embedding.

The term "impregnated with the membrane substance", as used in disclosing the present invention, means the result of applying membrane dope to the spacer fabric in such a way, e.g. using a coating techniques such as doctor blade coating, extrusion coating or slot coating, that the membrane dope penetrates the spacer fabric followed by conversion of the membrane dope into membrane substance.

The term "continuous region", as used in disclosing the present invention, means a region surrounding a predefined area, which is typically rectilinear. Part of the continuous region enclosing one predefined area can form part of a continuous region surrounding an adjacent predefined area or there can be a gap between adjacent continuous regions in which there is no impregnation of membrane dope.

The term "membrane dope", as used in disclosing the present invention, means a composition or compositions which can be converted into membrane substance in at least one subsequent process step.

The term "mesh", as used in disclosing the present invention, means every kind of open space enclosed in a network structure or fabric. The term "mesh" may therefore also refer to a hole or an opening within the network or fabric.

The term "substantially flat", as used in disclosing the present invention, means having no macroscopic curvature.

The term "substantially parallel", as used in disclosing the present invention, means having an angle to one another between −25° and +25°. This parallelism pertains whatever the shape of the membrane bag due to the integrated nature of the integrated permeate channel.

The term "substantially perpendicular", as used in disclosing the present invention, means having an angle to the transport direction of between 70° and 110°.

The term "substantially free", as used in disclosing the present invention, means less than 30%, preferably less than 20% and particularly preferably less than 10%.

The term "membrane seam", as used in disclosing the present invention, means the join between the edges of the substantially parallel membranes consisting of membrane substance.

The term "lips of the slot" means, for a slot disposed perpendicular to the transport direction of the fabric, those parts of the impregnation head parallel to the transport direction which are on one or other side of the slot.

The term "length of the lips of the slot", as used in disclosing the present invention, means the distance between an edge of the slot perpendicular to the transport direction and the edge of the adjacent part of the impregnation head parallel to the transport direction i.e. "$L_1$" or "$L_2$" in FIG. 9.

The term "slot faces", as used in disclosing the present invention, means the surfaces forming the four sides of the slot.

The term "slot opening height", as used in disclosing the present invention, means the average distance between the slot faces perpendicular to the transport direction of the fabric i.e. "h" in FIG. 9.

The term "slot height", as used in disclosing the present invention, means the distance between the slot opening and the manifold connected to the slot i.e. k in FIG. 9.

SHORT DESCRIPTION OF THE FIGURES

Figure 6:
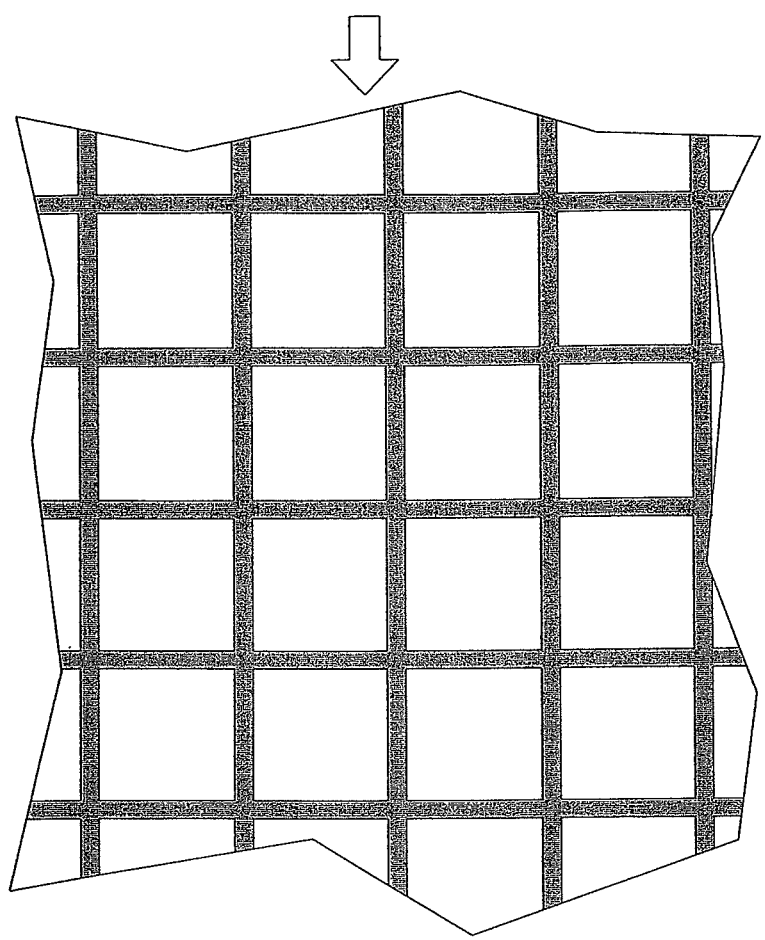
FIG. 6 shows a schematic representation of part of an array of seamless membrane bags comprising a spacer fabric having a uniform structure prior to separation into individual bags as a cross-section through the integrated permeate channel parallel to the membranes, where the grey areas represent the membrane substance, the arrow indicates the transport direction of the spacer fabric.
Figure 7:
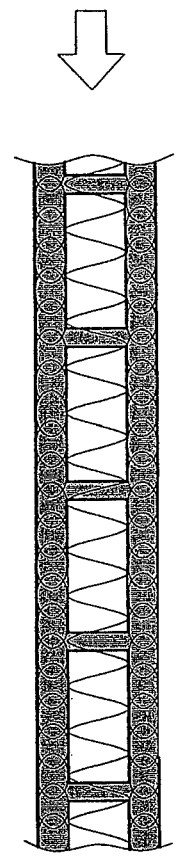

FIG. 7 shows a schematic representation of part of an array of seamless membrane bags comprising a spacer fabric having a uniform structure prior to separation into individual bags as a cross-section perpendicular to the cross-section of FIG. 6 intermediate between the edges of the seamless membrane bags showing four seamless membrane bags in profile, where the arrow indicates the transport direction of the spacer fabric.

Figure 8:
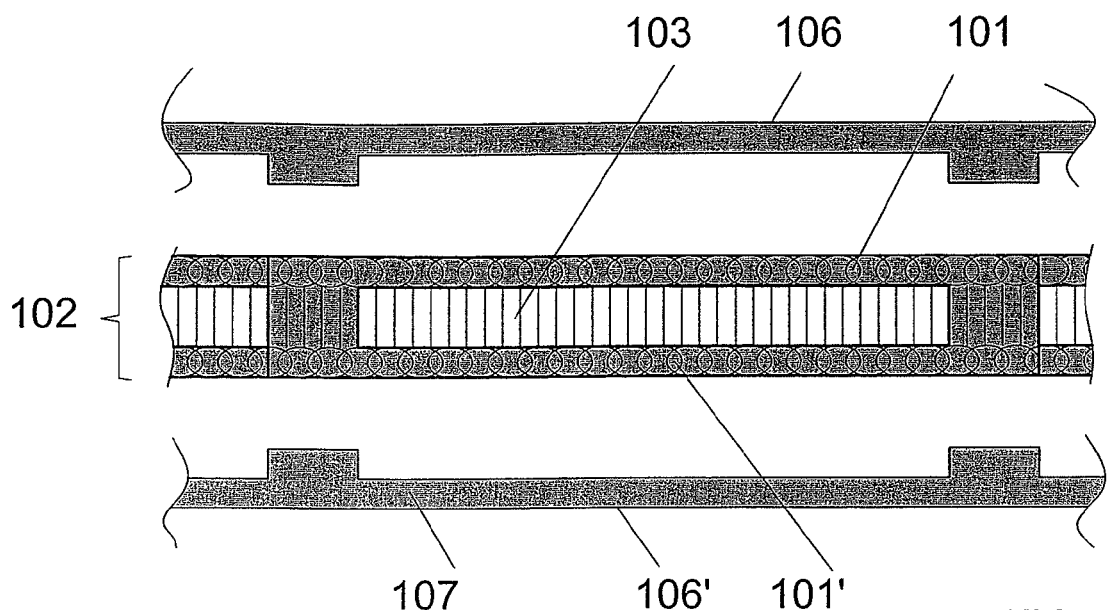

FIG. 8 shows schematically the membrane dope impregnation/embedding system in greater detail for impregnation of the predefined continuous regions in which not only the first and second parts of the spacer fabric are at least partially embedded with membrane dope but also the space therebetween is filled with membrane dope.

Figure 9:
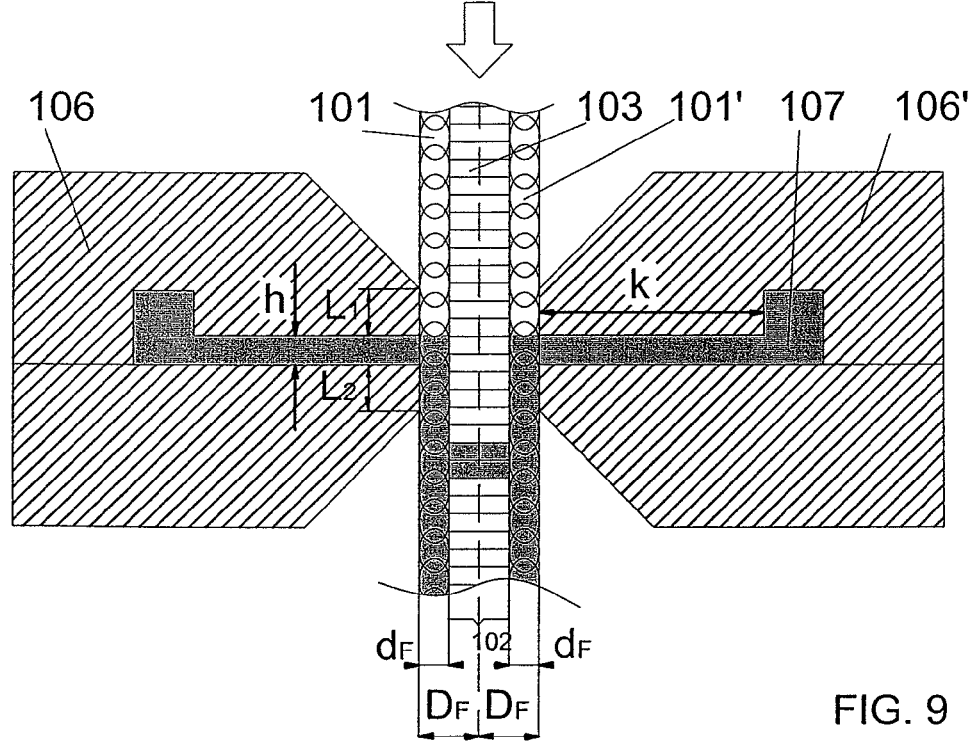

FIG. 9 shows schematically impregnation heads [106] and [106'] adapted to provide increased quantities of membrane dope at the parts of the continuous regions parallel to the transport direction thereby realizing at predefined regions not only the at least partial embedding of the first and second parts of the spacer fabric but also the filling of the space therebetween with membrane dope.

Figure 10:
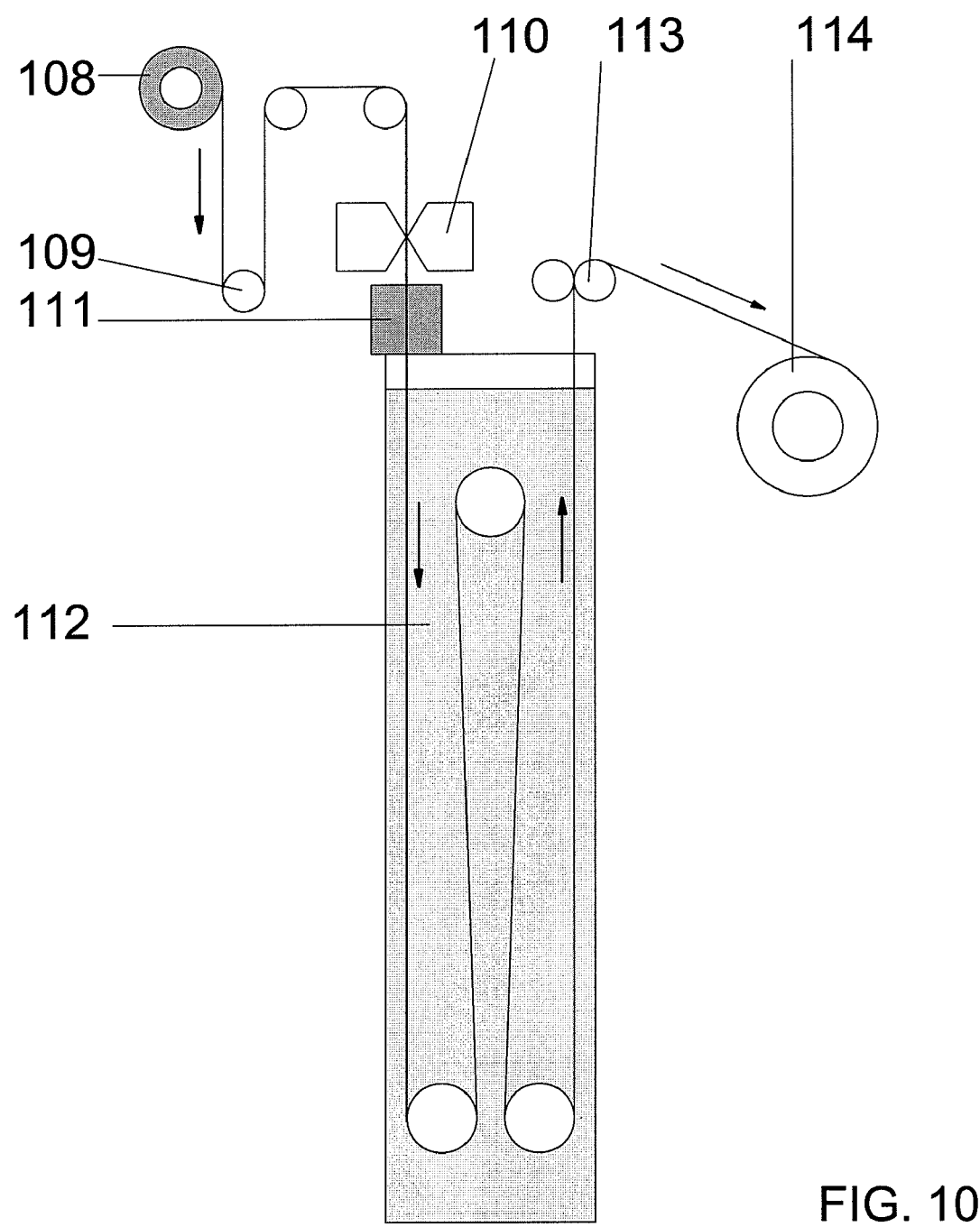

FIG. 10 shows a schematic of a production line for seamless membrane bags comprising a spacer fabric having a uniform structure, according to the present invention, where [108] is the feed roller, [109] is a compensating roller, [110] is the membrane dope impregnation system, [111] is a vapour phase (cold steam)(for phase inversion), [112] is a immersion bath (for phase inversion), [113] is a transport roller and [114] is a winding roller.

Figure 1:
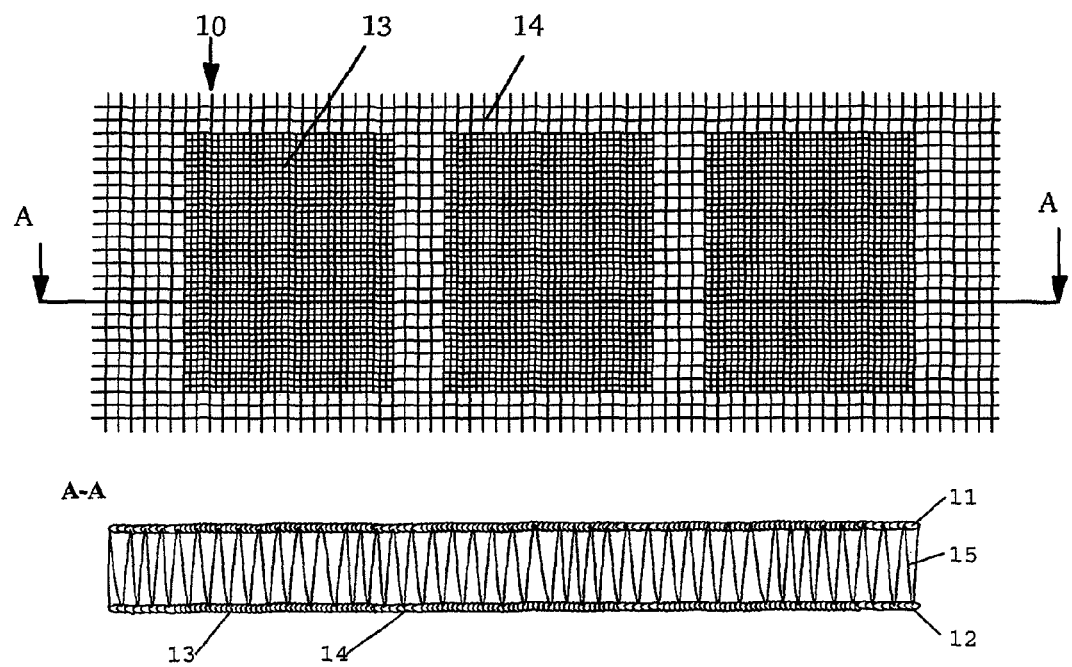
FIG. 1 shows a schematic representation of a non-uniform spacer fabric having a first and a second part which are spaced apart by monofilament thread. The spacer fabric comprises first regions, delimited by second regions.
Figure 11:
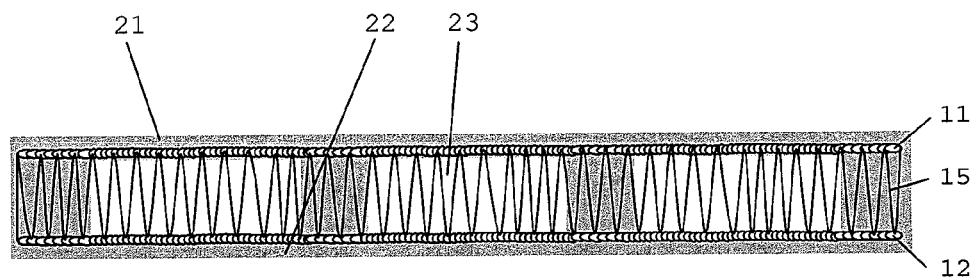

FIG. 11 shows a schematic representation of a cross-section of the non-uniform spacer fabric of FIG. 1 impregnated with membrane dope.

Figure 12:
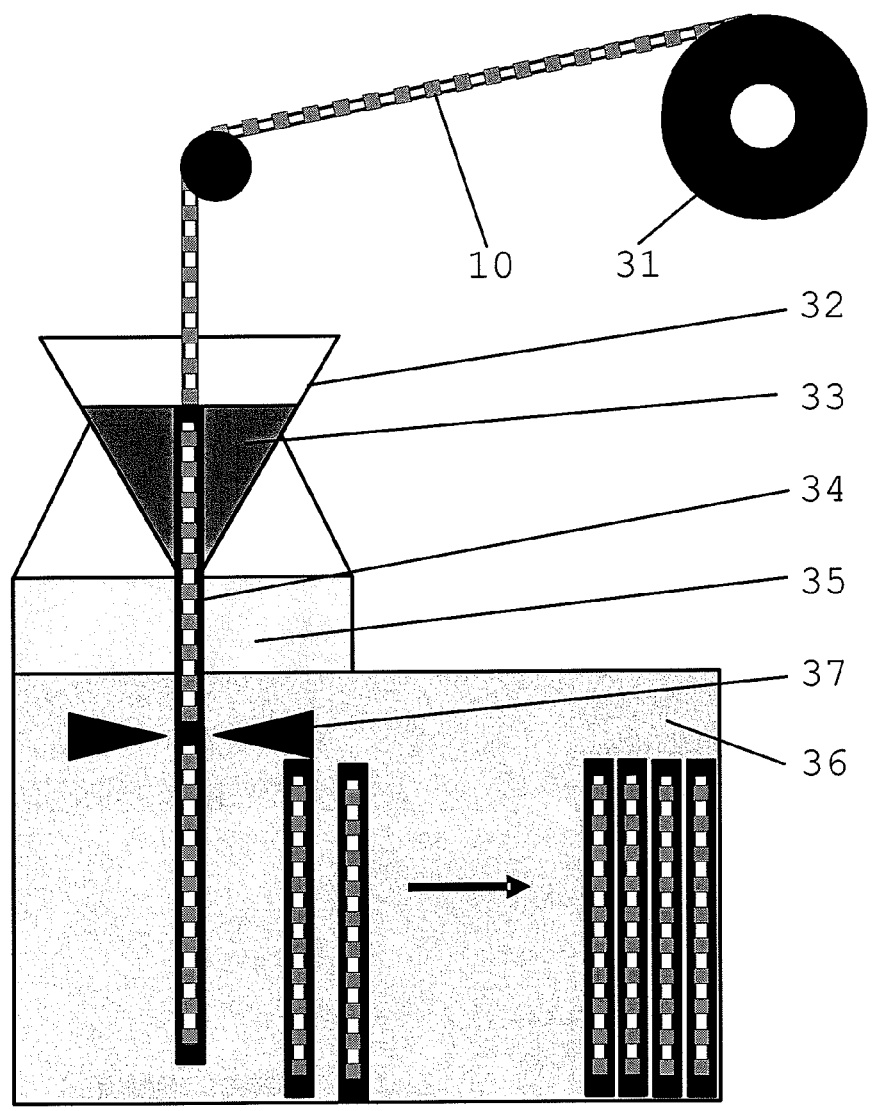

FIG. 12 shows a schematic of a production line for seamless membrane bags comprising a spacer fabric having a non-uniform structure for impregnating/embedding the spacer fabric with membrane dope and for converting the membrane dope into membrane substance.

MEMBRANE BAGS WITH SEAMLESS MEMBRANE SUBSTANCE

Aspects of the present invention are realized by a membrane bag comprising a spacer fabric [10] and a volume [23, 102] for permeate collection, the spacer fabric comprising a first [11, 101] and a second [12, 101'] part of the spacer fabric, wherein: the first and second parts of the spacer fabric are spaced apart and tied together at a predefined distance by monofilament thread [15, 103]; the first and second parts of the spacer fabric are at least partially embedded with membrane substance; the volume for permeate collection is interposed between the first and second parts of the spacer fabric; the membrane substance embeds portions of the monofilament thread; the membrane substance fills the spacer fabric along the border of the membrane bag; and wherein the membrane substance [43, 104] completely enclosing the volume [23, 102] is seamless.

According to a first embodiment of the membrane bag, according to the present invention, the volume is an integrated permeate channel.

According to a second embodiment of the membrane bag, according to the present invention, the membrane bag further comprises a tube [51, 105] for extracting permeate from the volume.

According to a third embodiment of the membrane bag, according to the present invention, the first and second parts of the spacer fabric embedded with the membrane substance are substantially parallel to one another with a parallelism one to one another of ±1 mm being preferred.

According to a fourth embodiment of the membrane bag, according to the present invention, the first and second parts of the spacer fabric at least partially embedded with the membrane substance are substantially planar.

According to a fifth embodiment of the membrane bag, the membrane substance provides a membrane having asymmetric pores, having a larger opening at the interface between the membrane substance and the volume than the opening at the outermost surface of the membrane bag not contiguous with the volume.

According to a sixth embodiment of the membrane bag, according to the present invention, none of the spacer fabric is exposed on the outermost surfaces of the membrane bag not contiguous with the volume.

According to a seventh embodiment of the membrane bag, according to the present invention, the monofilament thread forms loops through the first [11, 101] and second [12, 101'] parts of the spacer fabric and the loops are embedded with the membrane substance. Such incorporation of the loops into the membrane structure means that there is no freedom of movement of the loops, which makes the seamless bags quite rigid enabling membrane bags with large surfaces to be produced e.g. 2 m×2 m.

According to an eighth embodiment of the membrane bag, according to the present invention, the first and second parts of the spacer fabric are impregnated with membrane substance such that a thickness of at least 20 µm is provided above the outermost surfaces of the second parts of the spacer fabric non-contiguous with the volume, with a thickness of at least 50 µm of membrane substance being preferred.

According to a ninth embodiment of the membrane bag, according to the present invention, the volume provides an integrated permeate channel.

According to a tenth embodiment of the membrane bag, according to the present invention, the distance between the first and second parts of the fabric being between 0.5 and 15 mm, with between 1 and 10 mm being preferred and between 1.5 and 7 mm being particularly preferred.

According to an eleventh embodiment of the membrane bag, according to the present invention, portions of the monofilament thread are embedded in the membrane substance.

According to a twelfth embodiment of the membrane bag, according to the present invention, the tying together of the first and a second part of the fabric with a monofilament thread at a predefined distance does not constitute a fabric ply.

According to a thirteenth embodiment of the membrane bag, according to the present invention, the tying together of the first and a second part of the fabric does not constitute connection of two adjacent filter membranes to one another via threads of the two other fabric plies which extend through the third fabric ply.

According to a fourteenth embodiment of the membrane bag, according to the present invention, the first and second parts of the fabric do not constitute protective layers.

According to a fifteenth embodiment of the membrane bag, according to the present invention, the percentage of the volume occupied by the monofilament thread tying together the first and a second part of the fabric is 30% or less, with 10% or less being preferred and 5% or less being particularly preferred.

According to a sixteenth embodiment of the membrane bag, according to the present invention, seamless borders of the membrane bag consist of membrane substance filling the space between the membrane substance-embedded first and second parts of the spacer fabric.

According to a seventeenth embodiment of the membrane bag, according to the present invention, the volume is substantially free of membrane substance.

According to an eighteenth embodiment of the membrane bag, according to the present invention, the first and second parts of the spacer fabric are at least 50% embedded/impregnated with the membrane substance, with at least 80% embedded/impregnated with the membrane substance being preferred.

According to a nineteenth embodiment of the membrane bag, according to the present invention, the membrane bag further comprises a spacer fabric and none of the spacer fabric is exposed on the outermost surfaces of the membrane bag not contiguous with the volume.

The membrane bag [40] comprises a spacer fabric comprising a first part [11, 101] and a second [12, 101'] part which are tied together and spaced apart at a preferably constant, predefined distance by a monofilament spacer thread [15, 103]. The volume [23, 102] is located within the spacer fabric, interposed between parts [11, 101] and [12, 101']. Both the first part [11] and the second part [12] are made of a fabric comprising meshes and are impregnated with membrane substance [43, 104]. The membrane substance [43, 104] is linked at a multitude of points to the first part [11, 101] and the second [12, 101'] part due to impregnation, these points being preferably spread uniformly over the first and second parts. The multitude of points are spread over the entire surface of the membrane bag. The membrane substance [43, 104] at least partially embeds the first [11] and the second [12] parts so as to fill and/or close the meshes of the fabric of the first and the second parts. The membrane substance also embeds portions of the spacer thread [15, 103], where those portions engage with the first [11, 101] or the second [12, 101'] part of the spacer fabric.

Along the border [41] of the membrane bag [40], the spacer fabric is completely filled—also at the inner side [44]—with membrane substance. As a result, volume [23] is completely enclosed and isolated from the ambient by membrane substance [43, 104]. Membrane substance [43, 104] is provided all around the volume [23, 102], both on the first part [11, 101] and the second part [12, 101'] between which volume [23, 102] is interposed, and also along the edge [44] of the bag in between the two parts [11, 101] and [12, 101'].

According to a twentieth embodiment of the membrane bag, according to the present invention, portions of the first and the second part of the spacer fabric are embedded in membrane substance at a multitude of points in the region of the volume for permeate collection.

According to a twenty-first embodiment of the membrane bag, according to the present invention, the meshes comprised in the first and second parts of the spacer fabric are filled by membrane substance.

Figure 4:
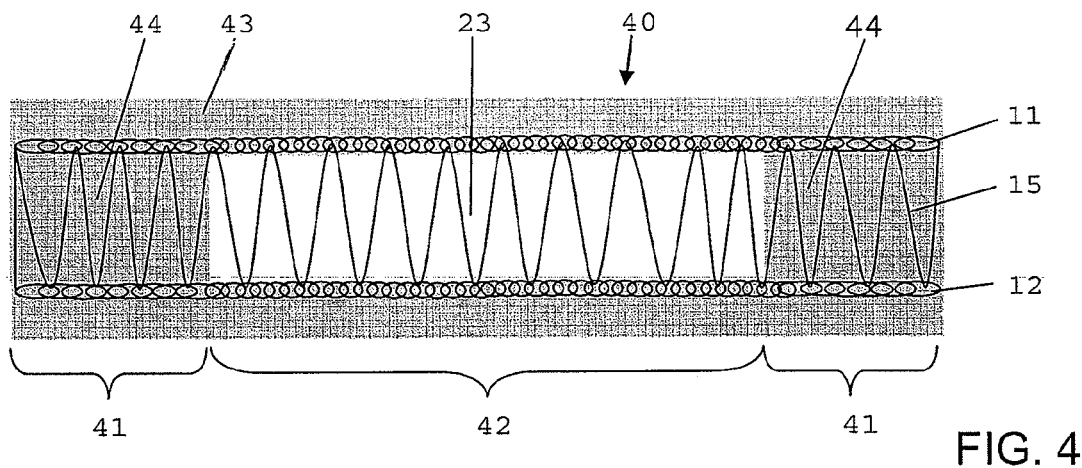
FIG. 4 shows a schematic representation of a cross-section of a seamless membrane bag comprising a spacer fabric having a non-uniform structure in which a volume for permeate collection is fully enclosed by membrane substance, both in a bottom and top plane and along sidewalls.
Figure 5:
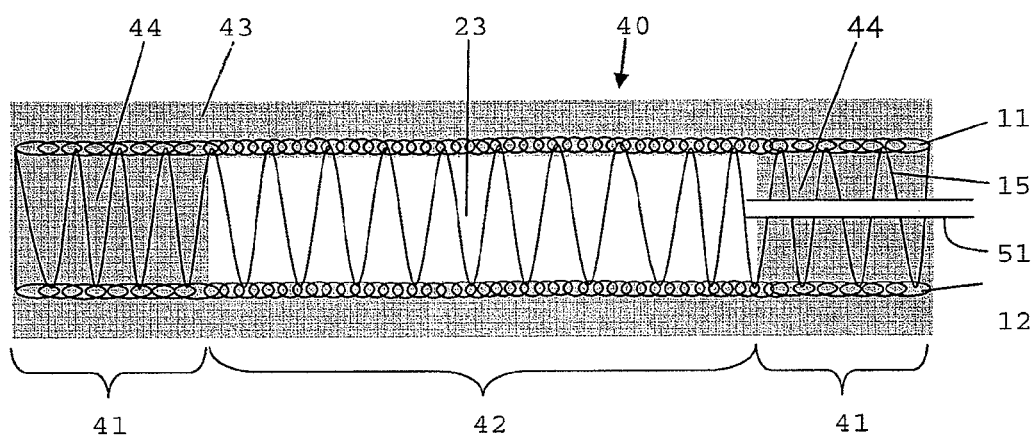
FIG. 5 shows a schematic representation of the seamless membrane bag of FIG. 4 comprising a tube for extraction of permeate inserted through a side wall of the bag.

According to an embodiment, illustrated in FIG. 4, a membrane bag [40] is provided, comprising a volume [23, 102], enclosed in membrane substance [43, 104]. The volume [23, 102] has dimensions such as to be suitable for permeate collection. The enclosed volume [23] therefore may be regarded as a permeate channel.

Membrane bag [40] may have a prismatic shape, with e.g. a rectangular base, although other shapes are equally possible (e.g. cylindrical). The enclosed volume [23, 102] may also have a prismatic shape, with rectangular base [42] and side walls [44], the height of which are defined by the spacing between the first part [11, 101] and the second part [12, 101'] of the spacer fabric.

According to a twenty-second embodiment of the membrane bag, according to the present invention, the membrane bag can withstand a backwash pressure of at least 10 bar.

According to a twenty-third embodiment of the membrane bag, according to the present invention, the membrane substance is porous all over and in every direction.

According to a twenty-fourth embodiment of the membrane bag comprising a spacer fabric, according to the present invention, the membrane is capable of being wound on a winding spool.

According to a twenty-fifth embodiment of the membrane bag, according to the present invention, the membrane bag further comprises a medium for adsorbing at least one contaminant e.g. a perfluoro-octanoic acid (PFOA).

Typical seamless membrane bags comprising a spacer fabric having a uniform structure, according to the present invention, have dimensions of 0.5 m×0.5 m, 0.5 m×1 m, 1.5 m×0.7 m and 1.0 m×1.0 m. Seamless membrane bags having dimensions of 0.1 m×0.1 m, according to the present invention, have been produced which can be back-flushed at pressures up to at least 17 bar.

Seamless membrane bags comprising a spacer fabric having a uniform structure, according to the present invention, can be used up to temperatures of 120° C. depending upon the choice of materials.

Membrane Bag with Seamless Membrane Substance Based on a Uniform Spacer Fabric

According to a twenty-sixth embodiment of the membrane bag, according to the present invention, the spacer fabric is uniform.

Aspects of the present invention are realized by a membrane bag comprising a spacer fabric [10] and a volume [102] for permeate collection, the spacer fabric comprising a first [101] and a second [101'] part of the spacer fabric, wherein: the first and second parts of the spacer fabric are spaced apart and tied together at a predefined distance by monofilament thread [103]; the first and second parts of the spacer fabric are at least partially embedded with membrane substance; the volume for permeate collection is interposed between the first and second parts of the spacer fabric; the membrane substance embeds portions of the monofilament thread; the membrane substance fills the spacer fabric along the border of the membrane bag; and wherein the membrane substance [104] completely enclosing the volume [102] is seamless.

Aspects of the present invention are realized by a membrane bag comprising a spacer fabric having a uniform structure, the spacer fabric comprising a first and a second part of the fabric spaced apart and tied together at a predefined distance by monofilament thread, preferably with the monofilament thread forming loops through the first [11, 101] and second [12, 101'] parts of the spacer fabric; wherein the first and second parts of the fabric optionally with the loops are impregnated with membrane substance to form two membranes which are preferably substantially parallel to one another and have an integrated permeate channel between the innermost surfaces thereof, the two membranes preferably have asymmetric pores and edges, the corresponding edges of each of the membranes are joined together by the membrane substance bridging the distance between the membranes, a tube is provided for extracting permeate from the integrated permeate channel and preferably none of the spacer fabric is exposed on the outermost surfaces of the membranes.

Figure 2:
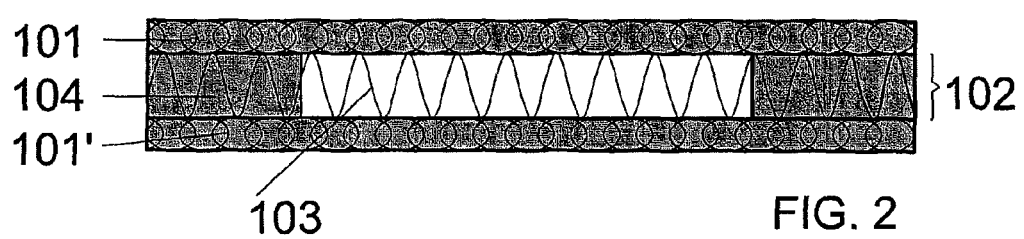
FIG. 2 shows a schematic representation of a seamless membrane bag comprising a spacer fabric having a uniform structure, according to the present invention, but without a tube for extracting permeate from the integrated permeate channel.

FIG. 2 shows a schematic representation of a seamless membrane bag comprising a spacer fabric having a uniform structure, according to the present invention, but without a tube for extracting permeate from the integrated permeate channel, where [101] is the first part and [101'] the second part of the spacer fabric, [102] is the space between the first and second parts of the spacer fabric maintained with monofilament spacer threads [103]. The membrane substance is indicated by the number [104].

Figure 3:
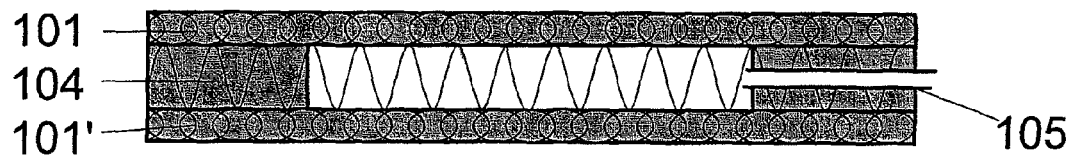
FIG. 3 shows a schematic representation of a seamless membrane bag according to the present invention with a tube for extracting permeate from the integrated permeate channel.

FIG. 3 shows a schematic representation of a seamless membrane bag comprising a spacer fabric having a uniform structure, according to the present invention, with a tube [105] for extracting permeate from the integrated permeate channel. [101] is the first part and [101'] the second part of the spacer fabric, [102] is the space between the first and second parts of the spacer fabric maintained with monofilament spacer threads [103]. The membrane substance is indicated by [104].

Membrane Bag with Seamless Membrane Substance Based on a Non-Uniform Spacer Fabric According to a twenty-seventh embodiment of the membrane bag, according to the present invention, the spacer fabric is non-uniform.

Aspects of the present invention are realized by a membrane bag comprising a spacer fabric [10] and a volume [23] for permeate collection the spacer fabric comprising a first [11] and a second [12] part of the spacer fabric, wherein the first and second parts of the spacer fabric are spaced apart and tied together at a predefined distance by monofilament thread [15]; the spacer fabric [10] comprises one or more first regions [13] in which the fabric of the first part and the fabric of the second part have a first structure and one or more second regions [14] in which the fabric of the first part and the fabric of the second part have a second structure, the second structure having larger meshes than the first structure; each of the one or more first regions is fully delimited around by the one or more second regions; in the one or more first regions the first part and the second part of the spacer fabric is at least partially embedded with membrane substance leaving the volume [23] between the first part and the second part free from membrane substance; and the one or more second regions of the spacer fabric the spacer fabric is filled with the membrane substance.

Aspects of the present invention are also realized by a membrane bag comprising a spacer fabric [10] having a non-uniform structure, a volume [23] for permeate collection and a tube [51] for extracting permeate from the volume [23], the spacer fabric comprising a first [11] and a second [12] part of the spacer fabric, wherein the first and second parts of the spacer fabric are spaced apart and tied together at a predefined distance by monofilament thread [15]; the first and second parts of the spacer fabric are at least partially embedded with membrane substance; the membrane substance embeds portions of the monofilament thread; the non-uniform structure consists of one or more first regions having a first structure and one or more second regions having a second structure having larger meshes that the first structure; the volume for permeate collection is interposed between parts of the first and second parts of the spacer fabric corresponding to the first region of the spacer fabric having smaller meshes that the second structure; the border of the membrane bag corresponds to at least part of the second region of the spacer fabric having a second structure having larger meshes than the first structure; the membrane substance completely fills the second regions of the spacer fabric; and wherein the volume is thereby completely enclosed in the membrane substance [43] making the membrane bag seamless.

According to a first embodiment of the membrane bag comprising a non-uniform spacer fabric, according to the present invention, the completely filled spacer fabric along the border of the membrane bag has a different structure from that of the first and second parts of the spacer fabric in which the spacer fabric is not completely filled.

Aspects of the present invention are also realized by a seamless membrane bag comprising a spacer fabric having a non-uniform structure, the spacer fabric comprising a first and a second part of the fabric spaced apart and tied together at a predefined distance by monofilament thread, preferably with the monofilament thread forming loops through the first [11, 101] and second [12, 101'] parts of the spacer fabric; wherein the first and second parts of the non-uniform fabric optionally with the loops are impregnated with membrane substance to form two membranes which are preferably substantially parallel to one another with an integrated permeate channel therebetween, the non-uniform structure comprising one or more first regions having a first structure and one or more second regions having a second structure having larger meshes that the first structure and the corresponding edges of each of the membranes are joined together by the membrane substance bridging the distance between the membranes in a region with a different structure from that in which the membranes are not joined together and a tube is provided for extracting permeate from the integrated permeate channel.

According to a second embodiment of the membrane bag comprising a non-uniform spacer fabric, according to the present invention, the spacer fabric comprises a repetitive pattern of first regions.

According to a third embodiment of the seamless membrane bag comprising a non-uniform spacer fabric, according to the present invention, One second region preferably contours (surrounds) each of the first regions.

According to a fourth embodiment of the seamless membrane bag comprising a spacer fabric having a non-uniform structure, according to the present invention, the second region extends in the form of a network in between the first regions.

According to a fifth embodiment of the seamless membrane bag comprising a non-uniform spacer fabric, according to the present invention, the fabric of the first part [11] and of the second part [12] in a first, central region [42] comprises smaller meshes than in a second, border region [41]. The first region [42] extends over the enclosed volume [23], wherein the spacer fabric is not filled with membrane substance. In the second region 41, the spacer fabric is completely filled with membrane substance.

Spacer Fabric

The spacer fabric is composed of a single fabric (knitted, woven or non-woven type of fabric) two parts of which are tied together with spacer monofilament thread [15, 103] at multiple points to the first and second parts of the fabric e.g. up to 30 points per inch (25.4 mm) in one direction and up to 60 points per inch (25.4 mm) in a substantially perpendicular direction.

The spacer monofilament thread [15, 103] entangles with the first [11, 101] and second [12, 101'] parts of the spacer fabric in order to keep the parts apart and hold them together at the specified distance. The spacer monofilament thread [15, 103] preferably forms loops through the first [11, 101] and second parts [12, 101'] of the spacer fabric. The distance [102] between the first [101] and second [101'] parts of the spacer fabric is determined by the length of the spacer monofilament threads [103] therebetween. The spacing distance between the two parts [11, 101] and [12, 101'] is preferably in the range between 0.5 mm and 15 mm, more preferably between 0.5 and 10 mm.

The thickness of the spacer fabric i.e. the distance from the outermost surface of the first part to the outermost surface of the second part is typically in the range of 1 to 15 mm.

The monofilament threads preferably have a diameter in the range of 50 to 500 µm, with a diameter in the range of 60 to 150 µm being particularly preferred and a diameter in the range of 80 to 100 µm being especially preferred. The monofilament threads preferably have a smooth surface.

The first and second parts of the spacer fabric preferably have an open area i.e. area not occupied by the fabric in the range of 20 to 80%, with an open area in the range of 40 to 60% being particularly preferred.

The first and second parts of the spacer fabric preferably have a thickness in the range of 100 µm to 800 µm, with a thickness range of 150 to 500 µm being particularly preferred.

The first and second parts of the spacer fabric preferably have a mesh size of at least 200 µm with a maximum mesh size of 3000 µm.

Any multifilament yarns used in the spacer fabric preferably have a diameter in the range of 50 to 500 µm, with a diameter in the range of 60 to 150 µm being particularly preferred and a diameter in the range of 80 to 100 µm being especially preferred. Any multifilament yarn used in the spacer fabrics is also preferably of the flat yarn type with a surface finish without loose yarns that could penetrate the membrane substance impregnated in the first and second parts of the spacer fabric i.e. having a smooth surface.

The maximum elongation of the spacer fabric without fracture upon pulling in either the machine direction or a direction perpendicular to the machine direction is preferably in the range of 1 to 10%, with a maximum elongation in the range of 1 to 3% being particularly preferred. Such low elasticity can be obtained by preshrinking and/or by thermal setting (fixing) the spacer fabric after the production process. Treatment time and temperature depend upon the construction of the spacer fabric and upon the diameters of the yarns used (thermofixation of the loops and the monofilament thread and the multifilament yarn of the spacer fabric).

The maximum compression of the spacer fabric upon application of a force of 1 bar or 1 kg/cm$^2$ between the surfaces of the first and second parts of the spacer fabric is preferably 10%. This can be realized wither by using double thin monofilaments each 60 µm in diameter or by using thicker monofilament threads of 100 to 150 µm in diameter.

Such spacer fabrics may be manufactured on such machines as a Multibar Raschel circular knitting machine (Karl Mayer Textilmaschinenfabrik, Germany). This machine may knit a spacer fabric in a width of up to 4 m and a length of up to 100 m. The spacer fabric is knitted circularly and is then cut to obtain a planar spacer fabric and finally wound on a spool. The spacer fabric may also be knitted on a flat knitting machine.

The fabric of the first and second parts of the spacer fabric is preferably made with multifilament yarn. The yarn used in the first and second parts of the spacer fabric may be of the same type as that of the spacer monofilament thread.

Suitable materials for the fabric thread and/or spacer thread include polyester e.g. polyethylene terephthalate (PET), polyamide/nylon (PA), polypropylene (PP), polyethylene (PE), poly(phenylene sulphide) (PPS), polyetherketone (PEK), polyetheretherketone (PEEK), ethylene tetrafluoroethylene (ETFE), monochlorotrifluoroethylene (CTFE), all metals (Fe, Cu, stainless steel etc.). A particularly preferred material for the fabric thread and/or spacer thread is polyester.

Spacer fabrics are available from SCOTT & FYFE under the tradename SCOTKNIT 3D, CULZEAN TEXTILE SOLUTIONS, SOUTHERN WEAVING COMPANY and MUELLER TEXTIL GMBH.

Spacer fabrics with a mesh size smaller than about 1000 µm are known as closed-face structure fabrics and spacer fabrics with a much larger mesh size are known as open-face structure fabrics. Spacer textiles with a uniform structure, i.e. both the first and second parts of the spacer fabric have a uniform mesh size, are produced in three variants: first and second parts both with a closed-face structure; first and second parts with an open-face structure; and the first part having a closed-face structure and the second part having open-face structure having an open-face structure or vice versa.

Spacer textiles [10] are also produced with non-uniform structures in which the first [11] and second [12] parts of the spacer fabric each comprise one or more first regions having a first structure and one or more second regions having a second structure with the second structure having larger meshes than the first structure. Each of the first regions [13] is bound all around by a second region [14], in which the fabric of the two parts [11] and [12] has a second structure comprising larger meshes (or holes, openings), larger than the meshes of the first structure creating an "island structure". The second region may form a continuous network throughout the fabric. As a result, the two parts [11] and [12] comprise isolated first regions [13], which are surrounded (contoured) by the second region [14]. Such fabrics are known as "island cloth space fabrics" with first and second parts each having repeating regions of open and closed face structures corresponding to one another. The fabric may be of any kind, i.e. woven or non-woven, and is preferably knit, braided or crocheted. Furthermore, the spacer thread [15] holds the two parts [11] and [12] together, at the predefined distance, such that the first regions [13] in both parts [11] and [12] face each other i.e. they are arranged at corresponding positions at both faces [11] and [12] of the fabric. The fabric of the first part and the fabric of the second part need not be identical, as long as in the second region(s) each of the fabrics of the two parts has a larger mesh size than in the respective first region(s).

The spacer fabric in the case of non-uniform spacer fabrics may be formed of a repeating pattern of first regions with a first mesh size and second regions with a second mesh size. The mesh size of the first regions is preferably in the range of 500 to 750 µm and the mesh size of the second regions is preferably in the range of 1000 µm to 10,000 µm, with a range of 1000 to 2000 µm being particularly preferred. The first regions The first regions, so-called "closed-face islands, may be rectangular in shape with side lengths between 200 mm and 4000 mm. Rectangular first regions may be divided by a band of a second region, the interspacing between adjacent first regions (i.e. the width of the second region) being between 10 mm and 100 mm, which may in addition contain holes with a diameter of 0.1 to 1 cm. The first regions may have other shapes than a rectangular shape e.g. a circular shape, a polygonal shape etc.

Filtration Unit

Aspects of the present invention are also realized by a filtration unit comprising at least one seamless membrane bag, according to the present invention.

According to a first embodiment of the filtration unit, according to the present invention, one or more seamless membrane bags are suspended or mounted in frames, preferably substantially flat and parallel to one another.

Process for Producing at Least One Seamless Membrane Bag Based on Uniform Spacer Fabrics Aspects of the present invention are further realized by a process for producing at least one seamless membrane bag, the process comprising the steps of: (i) providing a spacer fabric having a uniform structure, the spacer fabric comprising a first [101] and a second part [101'] of the fabric spaced apart and tied together at a predefined distance by monofilament thread [103]; (ii) transporting the fabric adjacent to at least one impregnation unit [106]; (iii) impregnating the first [101] and second parts [101'] of the spacer fabric and the tying points of the monofilament thread to the first [101] and second parts [101'] of the spacer fabric with membrane dope [107] with the at least one impregnation unit [106] such that in predefined continuous regions not only the first and second part of the fabric are impregnated but also the space therebetween thereby producing at least one seamless membrane bag precursor; (iv) forming the at least one membrane bag from the at least one membrane bag precursor, each of the at least one membrane bags comprising a volume [102] completely enclosed with seamless membrane substance; and (v) optionally inserting a tube for extracting permeate from the volume [105]. Moreover, asymmetric pores are formed during the phase inversion process with a larger opening at the interface between the membranes and the volume completely enclosed with seamless membrane substance (integrated permeate channel) than at the outermost surface of the membranes.

The impregnation of the continuous regions may be realized with a membrane dope with a different composition from that used for solely impregnating the first and second parts of the fabric i.e. for the region of fabric which the continuous region surrounds. Moreover, the impregnation of the continuous regions may be performed with at least one different impregnation head and the parts of the continuous regions parallel to the transport direction may be impregnated with a different membrane dope to that used for the parts of the continuous region substantially perpendicular to the transport direction. However, the impregnation with membrane dope must be completed before the membrane dope impregnated fabric is converted into at least one seamless membrane bag.

According to a first embodiment of the process, according to the present invention, the monofilament spacer thread forms loops through the first and second parts of the spacer fabric, which are preferably embedded with membrane dope. Embedding of the loops in the first and second parts of the spacer fabric with membrane dope occurs during the impregnation process.

According to a second embodiment of the process, according to the present invention, the membrane dope is provided to the fabric in more than one wet layer.

According to a third embodiment of the process, according to the present invention, the membrane dope is provided to the fabric in more than one wet layer with different compositions thereby giving a membrane with an outermost part with a different composition.

FIG. 6 shows a schematic representation of part of an array of seamless membrane bags prior to separation into individual units as a cross-section through the integrated permeate channel parallel to the membranes, where the grey areas represent the membrane substance, the arrow indicates the transport direction of the spacer fabric.

FIG. 7 shows a schematic representation of part of an array of seamless membrane bags prior to separation into individual units as a cross-section perpendicular to the cross-section of FIG. 6 intermediate between the edges of the seamless membrane bags showing four seamless membrane bags in profile, where the arrow indicates the transport direction of the spacer fabric.

The membrane is formed in-situ by impregnating the first and second parts of the spacer fabric, optionally simultaneously, with membrane dope so that the meshes in the first and second parts of the spacer fabric are substantially filled and the space between the first and second parts of the spacer fabric is also filled in predefined continuous regions. The membrane is subsequently formed by a process in which the solvent in the membrane dope is extracted by a non-solvent of the membrane polymer from the dope in a phase inversion process followed by coagulation of the membrane polymer in the non-solvent. The extraction of the solvent/solvents in the membrane dope can be realized using by contact with vapour [vapour-induced phase separation (VIPS)] and/or liquid [liquid-induced phase separation (LIPS)]. The use of vapour or liquid during the phase inversion process determines the pore size attainable with pore sizes≦10 µm being obtained with VIPS and pore sizes≦50 nm being obtained with LIPS. VIPS on its own is only sufficient for thin impregnated layers of membrane dope.

Suitable non-solvents include water vapour phase (water vapour or cold steam, preferably at a vapour pressure of 0.02 to 5 bar and particularly preferably at a vapour pressure of 0.05 to 0.2 bar), water, or mixtures of water with aprotic solvents such as N-methyl-pyrrolidone (NMP), dimethylformamide (DMF), dimethylsulphoxide (DMSO) and dimethylacetamide (DMAC) and alcohols such as isopropanol.

The coagulating medium usually contacts the membrane dope on the outside of the membrane bag precursor and does not penetrate into the integrated permeate channel. Membranes are then obtained with asymmetric pore sizes with the smallest pores on the outside, since membrane formation is initiated from the outside.

Alternatively membrane formation is performed by evaporation of the solvent (dry phase inversion). The membrane dope may comprise two solvents in which case the solvent having the lower boiling point is evaporated first and membrane substance is formed. The solvent with the higher boiling point is trapped in the pores of the membrane substance and is evaporated afterwards.

According to a fourth embodiment of the process, according to the present invention, after the impregnation process is completed and prior to the forming of the membrane bags the space between the impregnated first and second parts of the fabric is filled with a gas or liquid to influence the shape and dimensions of the pores produced during the forming of the membrane bags.

According to a fifth embodiment of the process, according to the present invention, the formation of the at least one membrane bag involves, at least in part, vapour-induced phase separation.

According to a sixth embodiment of the process, according to the present invention, the membrane dope is converted into a membrane; and the at least one membrane bag comprises at least two membrane bags. Part of the continuous region enclosing one predefined area can form part of a continuous region surrounding an adjacent predefined area or there can be a gap between adjacent continuous regions in which there is no impregnation of membrane dope.

According to a seventh embodiment of the process, according to the present invention, the membrane dope is converted into a membrane; and the at least one membrane bag comprises at least two membrane bags, which are subsequently separated from one another into at least two seamless membrane bags.

According to an eighth embodiment of the process, according to the present invention, the at least two membrane bag precursors are separated from one another; and the individual membrane bag precursors converted into seamless membrane bags. Such separation can involve cutting through the part of continuous regions between two adjacent membrane bags or a gap between adjacent continuous regions in which there has been no impregnation of membrane dope.

According to a ninth embodiment of the process, according to the present invention, the impregnation is performed using extrusion coating techniques.

According to a tenth embodiment of the process, according to the present invention, the impregnation is performed using slot coating techniques.

Continuous impregnation of the first and second parts of the spacer fabric is preferably realized by the spacer fabric being transported past impregnating slots with the slots either almost touching or even slightly pressing into the surfaces of the first and second parts of the spacer fabric such that substantially complete impregnation with membrane dope is realized while the space between the first and second parts of the spacer fabric remains substantially free of the membrane dope except in predefined continuous regions in which the space between the first and second parts of the spacer fabric is also filled with the membrane dope. The required quantity of membrane dope is supplied through the slot either by regulating the flow rate or the quantity supplied with a pump via a feed-system.

FIG. 9 shows schematically the membrane dope impregnation system in greater detail for impregnation outside the predefined continuous region in which the space between the first and second parts of the spacer fabric is also filled with membrane dope. "v" is the transport speed of the spacer fabric, [101] and [101'] are the first and second parts of the spacer fabric and [102] is the space between the first and second parts of the spacer fabric maintained with monofilament spacer threads [103]. [106] and [106'] are the impregnation heads, [107] is the membrane dope, k is the length of the slot in the direct of flow of the membrane dope, h is the slot opening height, $d_F$ is the thickness of the first and second parts of the spacer fabric and $D_F$ is half the thickness of the spacer fabric i.e. the distance between the first and second parts of the spacer fabric is $2(D_F - d_F)$.

If all the required quantity of membrane dope is deposited without loss then the quantity, Q, in m³/s supplied by the feed will be completely taken up by the fabric is given by the expression (1):

$$Q = v \times d_F \times w \quad (1)$$

where the $d_F$ is the wet layer thickness in m; w is the impregnation (casting) width in m; and v is the transport speed in m/s. In other words it is solely dependent upon the volume/m².

To realize a membrane seam in the parts of the continuous regions substantially perpendicular to the transport direction, a minimum quantity of membrane dope, $Q_S$, has to be provided at each of the impregnation heads [106] and [106'], given by the expression (2):

$$Q_S = v \times D_F \times w \quad (2)$$

This increase in membrane dope flow can be realized by either increasing the flow rate or by reducing the transport speed for the period necessary to provide the necessary filling of the integrated permeate channel with membrane dope.

To realize a membrane seam in the parts of the continuous regions in the transport direction the impregnation head [106] must be adapted to provide the requisite increase in membrane dope quantity to fill the first part of the spacer fabric and half the distance between the first and second parts of spacer fabric for each membrane seam width and the impregnation head [106'] must be adapted to provide the requisite increase in membrane dope quantity to fill the first part of the spacer fabric and half the distance between the first and second parts of spacer fabric for the requisite membrane seam width for each membrane seam width for an array of seamless membrane bags. This can be attained by providing separate impregnation heads with limited widths at both ends of the broader impregnation heads. Alternatively impregnation heads can be provided in which at the requisite intervals the head is adapted to provide the requisite increase in membrane dope quantity for the limited widths of the membrane seams e.g. by increasing the width of the slot opening as shown in FIG. 8 in which [101] and [101'] are the first and second parts of the spacer fabric, [102] is the space between the first and second parts of the spacer fabric maintained with monofilament spacer threads [103], [107] is the membrane dope and [106] and [106'] are the impregnation heads. The distance between the lips of the slots and the spacer fabric is preferably in the range of +0.5 to −0.5 mm. The length of the lips of the slots, $L_1$ and $L_2$, are preferably in the range of 0.25 to 25 mm. The slot opening height is preferably in the range of 0.2 to 2 mm. The slot height is preferably in the range of 10 to 100 mm.

According to an eleventh embodiment of the process, according to the present invention, the membrane bag precursor edges parallel to the transport direction of the fabric are produced with an impregnation head adapted to increase locally the quantity of membrane dope.

According to a twelfth embodiment of the process, according to the present invention, the membrane bag precursor edges parallel to the transport direction of the fabric are produced with separate slots providing an increase in the quantity of membrane dope.

According to a thirteenth embodiment of the process, according to the present invention, the membrane bag precursor edges substantially perpendicular to the transport direction of the fabric are produced by locally increasing the flow of membrane dope.

According to a fourteenth embodiment of the process, according to the present invention, the membrane bag precursor edges substantially perpendicular to the transport direction of the fabric are produced by locally reducing the transport speed.

According to a fifteenth embodiment of the process, according to the present invention, the provision of membrane dope to the first and second parts of the fabric are such that outside the membrane-joins between corresponding edges of the substantially parallel membranes the integrated permeate channel is substantially free of the membrane dope.

According to a sixteenth embodiment of the process, according to the present invention, the provision of membrane dope to the first and second parts of the fabric are such that at least 50% thereof is impregnated with the membrane dope, with at least 80% being impregnated with the membrane dope being preferred.

According to a seventeenth embodiment of the process, according to the present invention, the impregnation of the first and second parts of the fabric with membrane dope is performed simultaneously.

According to an eighteenth embodiment of the process, according to the present invention, the impregnation of the predefined continuous regions in which not only the first and second part of the fabric are impregnated but also the space therebetween is performed with the same impregnation system.

According to a nineteenth embodiment of the process, according to the present invention, the process is a process requiring no manual intervention i.e. is a fully automated continuous process.

According to a twentieth embodiment of the process, according to the present invention, the transport speed/process speed of the process is at least 0.5 m/min, with transport speeds in the range of 0.5 to 5 m/min being preferred.

Method for Producing at Least One Seamless Membrane Bag Based on Non-uniform Spacer Fabrics Aspects of the present invention are realized by a method of manufacturing a membrane bag, the method comprising the steps of: providing a spacer fabric [10] comprising a first [11] and a second [12] part of fabric, wherein the first and the second parts are spaced apart and tied together at a predefined distance by monofilament thread [15] and wherein the spacer fabric comprises one or more first regions [13] in which the fabric of the first part and the fabric of the second part have a first structure, and one or more second regions [14] in which the fabric of the first part and the fabric of the second part have a second structure having larger meshes than the first structure, and wherein each of the one or more first regions are delimited fully around by the one or more second regions; impregnating the first [11] and the second [12] parts with membrane dope [33] wherein, in the one or more first regions, the dope at least partially embeds the first part and the second part and leaves a space [23] between the first part [11] and the second [12] parts free from membrane dope and wherein, in the one or more second regions, the dope fills the spacer fabric; and forming the membrane [35, 36].

In the step of impregnating the first [11] and second [12] parts of the spacer fabric [10] with membrane dope both parts [11] and [12] of the spacer fabric are coated from the outside. According to a first embodiment, the coating step is performed in a two-sided vertical coating machine as illustrated in FIG. 12. The coating machine of FIG. 12 allows simultaneous coating of both sides of the spacer fabric [10]. Therefore, the spacer fabric [10] is unwound from a spool [31] and fed to a two-sided coating device [32], which is filled with membrane dope [33].

The coating of both parts [11] and [12] of the spacer fabric should be such that in the first regions [13], membrane dope is provided at an external side of the fabric and at least partially embeds the first [11] and second [12] parts of the spacer fabric. The degree of penetration of the membrane dope is dependent upon the mesh size of the first and second regions of the first and second parts of the spacer fabric, the rate at which membrane dope is applied to the spacer fabric, the shear stress at which the membrane dope is applied to the spacer fabric, e.g. by a double doctor blade system or a double roller bar system, the time the spacer fabric is in contact with the dope being applied and the viscosity of the membrane dope. Therefore, in the closed-face structure regions the degree of penetration of the membrane dope will be much slower than in the open-face structure regions of the spacer fabric. Therefore, in the first regions [13], the closed-face structure meshes of the first [11] and second [11] parts of the spacer fabric are filled or closed by membrane dope and the penetration of membrane dope into the space between the first [11] and second [12] parts of the spacer fabric may only be partial. The membrane dope must not close off the space. In the first regions 13, the membrane dope hence impregnates the fabric of the first [11] and second [12] parts of the spacer fabric. In the first regions the membrane dope embeds a multitude of portions of the fabric of the first [11] and second [12] parts of the spacer fabric. The membrane dope thereby also embeds portions of the spacer thread running through the fabric of the first [11] and second [12] parts of the spacer fabric. (e.g. loops of the spacer thread 15]. By at least partially embedding the fabric of the first [11] and second [12] parts of the spacer fabric, a strong bonding may be obtained of the membrane dope to the fabric in the first regions in the first [11] and second [12] parts of the spacer fabric.

The fabric in the second regions 14 comprises larger meshes (or openings, holes) than in the first regions which allows the membrane dope to enter the spacer fabric and completely fill up the spacer fabric in the second regions. The filling up of the spacer fabric in the second regions is preferably performed from both sides (i.e. both from the outermost sides of the first [11] and second [12] parts of the spacer fabric. Based on the mesh size of the fabric in the second regions, the viscosity of the membrane dope must be adapted to achieve complete filling at desired contact times.

As a result of the impregnation step, an impregnated spacer fabric [34] is obtained, in which both the first [11] and second [12] parts of the spacer fabric are impregnated with membrane dope to form layers [21] and [22] respectively and in which, in the second regions, the membrane dope completely embeds the spacer fabric. Hence, a coated spacer fabric is obtained, as illustrated in FIG. 11, in which the first regions comprise air pockets [23] interposed between the coated layers [21] and [22]. The air pockets [23] are completely isolated from the outer ambient by membrane dope which fills the second region along the border of the first regions.

A following step comprises membrane formation. Membrane substance is formed from the membrane dope. The membrane dope may be coagulated by contacting the coated spacer fabric with the vapour [35] of a coagulating medium and/or with the coagulating medium [36] itself, which usually is provided in a liquid state (wet phase inversion). The vapour phase contact provides surface pore formation, whereas the liquid phase contact provides bulk pore formation. The coagulating medium contacts the membrane dope at the external side of the spacer fabric, but does not penetrate into the air pockets [23]. Hence, in the first regions, membranes may be obtained with asymmetric pore size distribution and with the smallest pores at the outer side. Membrane formation is initiated from the outside. Membrane formation is not initiated from the inside. According to an alternative embodiment, membrane formation is performed by evaporation of the solvent (dry phase inversion). The membrane dope may comprise two solvents. In that case, first the solvent having the lower boiling point is evaporated and membrane substance is formed. The solvent with the higher boiling point is trapped in the pores of the membrane substance and is evaporated afterwards.

According to a first embodiment of the method, according to the present invention, the step of providing the fabric comprises inserting a tube in the spacer fabric in between a first region and a second region.

According to a second embodiment of the method, according to the present invention, the second region comprises meshes having a size in the range between 1 and 10 mm.

According to a third embodiment of the method, according to the present invention, the method further comprises the step of cutting [37] the spacer fabric in and along the second region e.g. by knives. As a result, single first regions, or groups of first regions are obtained, which are collected and form membrane bags.

According to a fourth embodiment of the method, according to the present invention, the method further comprises the insertion of a tube for extraction of permeate from the enclosed volume [23] into the spacer fabric during the manufacturing of the spacer fabric. The impregnation step allows a membrane bag to be obtained with integrated permeate collector tube.

Membrane Dope

According to a twenty-first embodiment of the process, according to the present invention, and a fifth embodiment of the method, according to the present invention, the membrane dope is a liquid polymeric solution comprising a membrane polymer.

According to a twenty-second embodiment of the process, according to the present invention, and a sixth embodiment of the method, according to the present invention, the membrane dope has a viscosity between 1000 and 100,000 at a shear of $10\ s^{-1}$, with a viscosity in the range of 10,000 to 50,000 $s^{-1}$ being preferred.

According to a twenty-third embodiment of the process, according to the present invention, and a seventh embodiment of the method, according to the present invention, the membrane dope comprises at least one membrane polymer and at least one organic solvent therefor.

According to a twenty-fourth embodiment of the process, according to the present invention, and an eighth embodiment of the method, according to the present invention, the membrane dope comprises a membrane polymer, an organic solvent therefor and a hydrophilic filler material.

According to a twenty-fifth embodiment of the process, according to the present invention, and a ninth embodiment of the method, according to the present invention, the membrane dope comprises a membrane polymer, a hydrophilic filler material and an aprotic solvent.

According to a twenty-sixth embodiment of the process, according to the present invention, and a tenth embodiment of the method, according to the present invention, the membrane dope comprises a membrane polymer, a hydrophilic filler material, an aprotic solvent and a stabilizing agent, such as glycerol.

Hydrophilizing and stabilizing agents such as glycerol can also be incorporated after the phase-inversion process is completed, but before drying.

The hydrophilic filler influence the hydrophilicity of the membrane and its fouling behavior. Often a variation in solvent mixture will give rise to different film morphologies and hence in membrane performance.

According to a twenty-seventh embodiment of the process, according to the present invention, and an eleventh embodiment of the method, according to the present invention, the membrane dope comprises a membrane polymer selected from the group consisting of polysulphone (PSU), poly(vinyl chloride) (PVC), poly(acrylonitrile) (PAN), polyester, polyethersulphone (PES), polyetherketone (PEK), polyetheretherketone (PEEK), polyvinylidene fluoride (PVDF), polyvinyl acetate (PVAc), polyvinyl alcohol (PVA), polyamide (PA), polyvinylpyrrolidone (PVP), PVPP (crosslinked PVP), cellulosics [cellulose acetate (CA), cellulose triacetate (CTA) etc.], polycarbonate block polymers and mixtures/blends thereof.

According to a twenty-eighth embodiment of the process, according to the present invention, and a twelfth embodiment of the method, according to the present invention, the membrane dope comprises a rubber as membrane polymer.

According to a twenty-ninth embodiment of the process, according to the present invention, and a thirteenth embodiment of the method, according to the present invention, the membrane dope comprises a rubber as membrane polymer and the rubber is selected from the group consisting of silicone rubber, Polymethylpentene, Chloroprene, SBR, NBR, Urethane, Hypalon®, Neoprene, Nitrile, Buna, Urethane, Epichlorohydrin, Viton®, EPDM, Butyl, Natural Rubber (Latex), Acrylrubber, Fluoroelastomers and, Perfluoroelastomers.

Further suitable membrane polymers include chlorinated poly(vinyl chloride) (CPVC), copolymers of acrylonitrile e.g. with vinyl chloride or ethyl acrylate, poly(ethylene succinate) (PESU), polyurethanes (PU), polyimides (PI), polyetherimide (PEI) and cellulosics such as hydroxypropyl cellulose (HPC), carboxymethyl cellulose (CMC), and cellulose tricarbanilate (CTC) mixtures/blends thereof and their grafted derivatives (sulphonated, acrylated, aminated etc).

Suitable hydrophilic filler materials include polymers, inorganic materials and combinations thereof. Suitable hydrophilic polymers include poly(vinyl pyrrolidone) (PVP), crosslinked polyvinylpyrrolidone (PVPP), poly(vinyl alcohol), poly(vinyl acetate), methyl cellulose and polyethylene oxide.

Suitable hydrophilic inorganic materials include $TiO_2$, $HfO_2$, $Al_2O_3$, $ZrO_2$, $Zr_3(PO_4)_4$, $Y_2O_3$, $SiO_2$, perovskite oxide materials and SiC.

Suitable aprotic solvents include N-methyl-pyrrolidone (NMP), N-ethyl-pyrrolidone (NEP), N,N-dimethylformamide (DMF), formamide, dimethylsulphoxide (DMSO), N,N-dimethylacetamide (DMAC), tetrahydrofuran (THF), acetone, triethylphosphate and mixtures thereof. Films formed by immersion of a polysulphone-NMP solution in water are porous. However, different membrane structures can be obtained upon immersion of a polysulphone-NMP-THF solution in water.

INDUSTRIAL APPLICATIONS

The seamless membrane bags, according to the present invention, can be used as a frameless membrane cartridge. It may otherwise also be provided with a frame, along the border of the membrane bag. The seamless membrane bags, according to the present invention, can be used as filtration elements for microfiltration, ultrafiltration, nanofiltration, reverse osmosis, membrane distillation, pervaporation, gas separation, immobilizing biologically active species (e.g. enzyme and biofilm reactors); in membrane contactors e.g. supported liquid membranes, pertraction, water degassing, aeration, humidification (vapour permeation), controlled release; and in air conditioning: gas/air cleaning etc., since they can be backwashed efficiently and withstand high pressures thereby enabling long-term operation without the need for frequent cleaning. They can also be used in membrane bioreactors (for permeate withdrawal) and other membrane applications The present invention is illustrated hereinafter by way of COMPARATIVE EXAMPLES and INVENTION EXAMPLES without be limited thereto. The percentages and ratios given in these examples are by weight unless otherwise indicated.

The spacer fabric used in the INVENTION EXAMPLES was a type 5754-0320 polyester textile from MUELLER TEXTIL GMBH, WIEHL, GERMANY having a 100 µm thick knitted first and second part substantially parallel to one another with a distance therebetween of 3 mm maintained with a monofilament thread tied to the first and second parts with the monofilament thread forming loops in the first and second parts of spacer fabric.

Ingredients:

| | |
|---|---|
| A-100P NT = | A-100P NT, a polyethersulphone (PES) from SOLVAY. |
| K-90 = | Luviscol ® K-90, a poly(vinylpyrrolidone) (PVP) from BASF. |
| 1015/1001 = | Type 1015/1001, a polyvinylidene fluoride (PVDF) from SOLVAY. |
| ACE H827 = | KANE ACE H827, a chlorinated polyvinyl chloride (CPVC) from KANEGAFUCHI K.K. |
| MeCell = | a methyl cellulose from ACROS ORGANICS |

INVENTION EXAMPLE 1

Composition of Membrane Dopes

| | Membrane dope 1 | Membrane dope 2 | Membrane dope 3 |
|---|---|---|---|
| A-100P NT (PES) = | 20 wt % | — | — |
| 1015/1001 = | — | 17 wt % | — |
| ACE H827 = | — | — | 19 wt % |
| K-90 (PVP) = | 10 wt % | 6.5 wt % | — |
| MeCell = | — | — | 3 wt % |
| glycerol = | 9 wt % | — | — |
| N-ethyl pyrrolidone (NEP) = | 61 wt % | — | — |
| N,N-dimethylacetamide (DMAC) = | — | 76.5 wt % | — |
| N-methyl pyrrolidone (NMP) = | — | — | 78 wt % |

The apparatus schematically shown in FIG. 10 was used to apply the membrane dopes to the first and second parts of the spacer fabric via the impregnation system [110]. The impregnation speed i.e. the transport speed of the spacer fabric was 1 m/min and each impregnation head provided 400 mL/m.min of membrane dope at a temperature of 80° C. to each of the first and second parts of the spacer fabric with 1200 mL/m.min being provided for the edges of the seamless membrane bag parallel to the transport direction by larger slot openings and the edges of the seamless membrane bag substantially perpendicular to the transport direction being realized by reducing the transport speed.

FIG. 9 shows the impregnation system in greater detail for impregnation outside the predefined continuous region in which the integrated permeate channel is also filled with membrane dope.

Referring back to FIG. 10, the cold steam zone at a water vapour pressure of 0.07 bar [111] was used to realize a phase inversion in the membrane dope followed by coagulation to form stable membranes in the first and second parts of the fabric during the 5 second traversing of the cold steam zone followed by washing and rinsing in an immersion bath at a temperature of 60° C. [112] to remove the solvents N-ethylpyrrolidone, glycerol, N,N-dimethylacetamide and N-methyl-pyrrolidone respectively.

Performing the phase inversion in water vapour and the temperature of the water vapour determined the pore size in the membranes, which was in the range of 0.3 to 0.5 µm.

Treatment of the membranes with a 2000 ppm aqueous solution of hydrochlorous acid at 60° C. for 24 hours was necessary to increase the permeability thereof.

Finally the resulting seamless membrane bags, not yet separated into individual units, were wound onto a spool [114]. In a final step the individual membrane bags were cut from the impregnated spacer fabric providing 0.5 m by 1.0 m membrane bags, seamless by virtue of the integrated permeate channel being enclosed by porous membrane substance having the same composition.

The seamless membrane bags were evaluated in a membrane bioreactor for the treatment of silver-containing wastewater in Agfa-Gevaert N.V. The sludge was found not to form a glutinous mass and back-flushing was possible to pressures of at least 15 bar. More than 90% reduction in the chemical oxygen demand (COD) concentration was realized and more than 80% reduction in the nitrogen concentration.

INVENTION EXAMPLE 2

Composition of Membrane Dope for Non-uniform Spacer Fabric (Island Cloth Spacer Fabric)

| | Membrane dope 4 |
|---|---|
| A-100P NT (PES) | 6.6 wt % |
| K-90 (PVP) | 13.4 wt % |
| glycerol | 6 wt % |
| N-methyl pyrrolidone (NMP) | 74 wt % |

The vertical coating apparatus used to apply membrane dope 4 to the first and second regions of both parts of the "island cloth spacer fabric" schematically shown in FIG. 1 using the "hydrostatic head impregnation method" is schematically shown in FIG. 12. In the impregnation process the spacer fabric was fed from spool 31 over a roller into the impregnation head containing membrane dope in which the membrane dope is applied to the spacer fabric e.g. using a double doctor blade system or a double roller bar system. The impregnation head contains a slit having the same width as the textile and the dope was fed to the impregnation head. The height of the dope in the head was controlled automatically.

The volumetric flow of dope entering the textile depended upon the hydrostatic pressure exerted by the column of dope in the head, the speed of transport of the textile and the pore size of the regions in the spacer fabric. The transport speed of the spacer fabric was 1 m/min and the hydrostatic head was 10 cm high. The membrane dope temperature was 30° C. Membrane dope was applied to each of the first and second parts of the "island cloth spacer fabric" thereby impregnating the "island" regions of the spacer fabric and "ocean" contour region (edges) during passage through the impregnation head. The "island cloth spacer fabric used" had a total width perpendicular to the transport direction of 22.5 cm. The size of the individual "closed-face structure islands" (basic element) was 27.5 by 18.5 cm and the "ocean open-face structure contour" region was 2 cm in all directions away from the island regions as schematically shown in FIG. 1. The total thickness of the textile was 4 mm and the distance between the two faces was 3 mm. The size of the openings in the contour region was 2 mm.

After the impregnation step the spacer fabric was passed through a water vapour phase zone (vapour pressure of 0.035 bar) with a contact time of 4 seconds thereby realizing bringing about a phase inversion process resulting in pores being realized with a pore size of 0.3 to 5 μm, after which the impregnated spacer fabric was passed through a warm water coagulation bath (50° C.) to remove the solvents N-methyl-pyrrolidone and glycerol.

Subsequently the resulting membrane bags, not yet separated into individual bags, were wound onto a winding spool. The spool with the not yet separated membrane bags was subsequently immersed in a 2000 ppm NaOCl solution for 2 hours at 40° C. at pH 10, then washed with demineralised water and dried. Finally the individual membrane bags (295 mm by 205 mm) were cut from the impregnated spacer fabric providing seamless membrane bags, seamless by virtue of the integrated permeate channel being enclosed by porous membrane substance having the same composition.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claims:

1. A process for filtering fluids in a membrane bioreactor comprising utilizing at least one membrane bag comprising a spacer fabric and a volume for permeate collection, said spacer fabric comprising a first and a second part of said spacer fabric, wherein: said first and second parts of said spacer fabric are spaced apart and tied together at a predefined distance by monofilament thread; said first and second parts of said spacer fabric are at least partially embedded with membrane substance; said volume for permeate collection is interposed between said first and second parts of said spacer fabric; said membrane substance embeds portions of said monofilament thread; said membrane substance fills said spacer fabric along the border of said membrane bag; and wherein said membrane substance completely enclosing said volume is seamless.

2. A process for filtering fluids in a membrane bioreactor comprising utilizing at least one membrane bag comprising a spacer fabric and a volume for permeate collection said spacer fabric comprising a first and a second part of said spacer fabric, wherein said first and second parts of said spacer fabric are spaced apart and tied together at a predefined distance by monofilament thread; said spacer fabric comprises one or more first regions in which the fabric of said first part and the fabric of said second part have a first structure and one or more second regions in which the fabric of said first part and the fabric of said second part have a second structure, said second structure having larger meshes than said first structure; each of said one or more first regions is fully delimited around by said one or more second regions; in the one or more first regions said first part and said second part of said spacer fabric is at least partially embedded with membrane substance leaving said volume between said first part and said second part free from membrane substance; and said one or more second regions of said spacer fabric said spacer fabric is filled with said membrane substance.

3. A membrane bag comprising a spacer fabric and a volume for permeate collection, said spacer fabric comprising a first and a second part of said spacer fabric, wherein: said first and second parts of said spacer fabric are spaced apart and tied together at a predefined distance by monofilament thread; said first and second parts of said spacer fabric are at least partially embedded with membrane substance; said volume for permeate collection is interposed between said first and second parts of said spacer fabric; said membrane substance embeds portions of said monofilament thread; said membrane substance fills said spacer fabric along the border of said membrane bag; and wherein said membrane substance completely enclosing said volume is seamless.

4. The membrane bag according to claim 3, wherein said membrane bag further comprises a tube for extracting permeate from said volume.

5. The membrane bag according to claim 3, wherein said monofilament thread forms loops through said first and second parts of said spacer fabric and said loops are embedded with said membrane substance.

6. The membrane bag according to claim 3, wherein said first and second parts of said spacer fabric embedded with said membrane substance are substantially parallel to one another.

7. The membrane bag according to claim 3, wherein said first and second parts of said spacer fabric at least partially embedded with said membrane substance are substantially planar.

8. The membrane bag according to claim 3, wherein none of said spacer fabric is exposed on the outermost surfaces of said membrane bag not contiguous with said volume.

9. A membrane bag comprising a spacer fabric and a volume for permeate collection said spacer fabric comprising a first and a second part of said spacer fabric, wherein said first and second parts of said spacer fabric are spaced apart and tied together at a predefined distance by monofilament thread; said spacer fabric comprises one or more first regions in which the fabric of said first part and the fabric of said second part have a first structure and one or more second regions in which the fabric of said first part and the fabric of said second part have a second structure, said second structure having larger meshes than said first structure; each of said one or more first regions is fully delimited around by said one or more second regions; in the one or more first regions said first part and said second part of said spacer fabric is at least partially embedded with membrane substance leaving said volume between said first part and said second part free from membrane substance; and said one or more second regions of said spacer fabric said spacer fabric is filled with said membrane substance.

10. The membrane bag according to claim 9, wherein said membrane bag further comprises a tube for extracting permeate from said volume.

11. The membrane bag according to claim 9, wherein said monofilament thread forms loops through said first and second parts of said spacer fabric and said loops are embedded with said membrane substance.

12. The membrane bag according to claim 9, wherein said first and second parts of said spacer fabric embedded with said membrane substance are substantially parallel to one another.

13. The membrane bag according to claim 9, wherein said first and second parts of said spacer fabric at least partially embedded with said membrane substance are substantially planar.

14. The membrane bag according to claim 9, wherein none of said spacer fabric is exposed on the outermost surfaces of said membrane bag not contiguous with said volume.

15. A process for producing at least one seamless membrane bag, said process comprising the steps of:
(i) providing a spacer fabric having a uniform structure, the spacer fabric comprising a first and a second part of the fabric spaced apart and tied together at a predefined distance by monofilament thread;
(ii) transporting the fabric adjacent to at least one impregnation unit;
(iii) impregnating the first and second parts of the spacer fabric and the tying points of the monofilament thread to the first and second parts of the spacer fabric with membrane dope with the at least one impregnation unit such that in predefined continuous regions not only the first and second part of the fabric are impregnated but also the space therebetween thereby producing at least one seamless membrane bag precursor;
(iv) forming the at least one membrane bag from the at least one membrane bag precursor, each of the at least one membrane bags comprising a volume completely enclosed with seamless membrane substance; and
(v) optionally inserting a tube for extracting permeate from the volume.

16. The process according to claim 15, wherein said membrane dope is converted into a membrane; and the at least one membrane bag comprises at least two membrane bags, which are subsequently separated from one another into at least two seamless membrane bags.

17. The process according to claim 15, wherein said individual membrane bag precursor(s) is (are) converted into seamless membrane bag(s).

18. The process according to claim 15, wherein said impregnation is performed using extrusion coating or slot coating techniques.

19. The process according to claim 15, wherein said membrane bag precursor edges substantially perpendicular to the transport direction of said fabric are produced by locally increasing the flow of membrane dope.

20. The process according to claim 15, wherein said membrane bag precursor edges substantially perpendicular to the transport direction of said fabric are produced by locally reducing the transport speed.

21. A membrane bag obtained by a process for producing at least one seamless membrane bag, said process comprising the steps of:
(i) providing a spacer fabric having a uniform structure, the spacer fabric comprising a first and a second part of the fabric spaced apart and tied together at a predefined distance by monofilament thread;
(ii) transporting the fabric adjacent to at least one impregnation unit;
(iii) impregnating the first and second parts of the spacer fabric and the tying points of the monofilament thread to the first and second parts of the spacer fabric with membrane dope with the at least one impregnation unit such that in predefined continuous regions not only the first and second part of the fabric are impregnated but also the space therebetween thereby producing at least one seamless membrane bag precursor;
(iv) forming the at least one membrane bag from the at least one membrane bag precursor, each of the at least one membrane bags comprising a volume completely enclosed with seamless membrane substance; and
(v) optionally inserting a tube for extracting permeate from the volume.

22. A method of manufacturing a membrane bag, the method comprising the steps of:
providing a spacer fabric comprising a first and a second part of fabric, wherein the first and the second parts are spaced apart and tied together at a predefined distance by monofilament thread and wherein the spacer fabric comprises one or more first regions in which the fabric of the first part and the fabric of the second part have a first structure, and one or more second regions in which the fabric of the first part and the fabric of the second part have a second structure having larger meshes than the first structure, and wherein each of said one or more first regions are delimited fully around by the one or more second regions;
impregnating the first and the second parts with membrane dope wherein, in the one or more first regions, the dope at least partially embeds the first part and the second part and leaves a space between the first part and the second part free from membrane dope and wherein, in the one or more second regions, the dope fills the spacer fabric; and forming the membrane.

23. A membrane bag obtained by a method of manufacturing a membrane bag, the method comprising the steps of:
- providing a spacer fabric comprising a first and a second part of fabric, wherein the first and the second parts are spaced apart and tied together at a predefined distance by monofilament thread and wherein the spacer fabric comprises one or more first regions in which the fabric of the first part and the fabric of the second part have a first structure, and one or more second regions in which the fabric of the first part and the fabric of the second part have a second structure having larger meshes than the first structure, and wherein each of said one or more first regions are delimited fully around by the one or more second regions;
- impregnating the first and the second parts with membrane dope wherein, in the one or more first regions, the dope at least partially embeds the first part and the second part and leaves a space between the first part and the second part free from membrane dope and wherein, in the one or more second regions, the dope fills the spacer fabric; and
- forming the membrane.

24. A filtration unit comprising at least one membrane bag, said membrane bag comprising a spacer fabric and a volume for permeate collection, said spacer fabric comprising a first and a second part of said spacer fabric, wherein: said first and second parts of said spacer fabric are spaced apart and tied together at a predefined distance by monofilament thread; said first and second parts of said spacer fabric are at least partially embedded with membrane substance; said volume for permeate collection is interposed between said first and second parts of said spacer fabric; said membrane substance embeds portions of said monofilament thread; said membrane substance fills said spacer fabric along the border of said membrane bag; and wherein said membrane substance completely enclosing said volume is seamless.

25. A filtration unit comprising at least one membrane bag, said membrane bag comprising a spacer fabric and a volume for permeate collection said spacer fabric comprising a first and a second part of said spacer fabric, wherein said first and second parts of said spacer fabric are spaced apart and tied together at a predefined distance by monofilament thread; said spacer fabric comprises one or more first regions in which the fabric of said first part and the fabric of said second part have a first structure and one or more second regions in which the fabric of said first part and the fabric of said second part have a second structure, said second structure having larger meshes than said first structure; each of said one or more first regions is fully delimited around by said one or more second regions; in the one or more first regions said first part and said second part of said spacer fabric is at least partially embedded with membrane substance leaving said volume between said first part and said second part free from membrane substance; and said one or more second regions of said spacer fabric said spacer fabric is filled with said membrane substance.

* * * * *